US012664161B1

(12) United States Patent
Kleinerman et al.

(10) Patent No.: US 12,664,161 B1
(45) Date of Patent: Jun. 23, 2026

(54) METHODS TO FINE TUNE SIMPLE QUERY LANGUAGE GENERATION FROM NATURAL LANGUAGE INPUT

(71) Applicant: NICE LTD., Ra'anana (IL)

(72) Inventors: Semyon Kleinerman, Netanya (IL); Peter Lifshits, Kedumim (IL); Pavlo Osikovskyi, Gnivan (UA)

(73) Assignee: NICE LTD, Ra'anana, IL (US)

( * ) Notice: Subject to any disclaimer, the term of this patent is extended or adjusted under 35 U.S.C. 154(b) by 0 days.

(21) Appl. No.: 19/248,791

(22) Filed: Jun. 25, 2025

(51) Int. Cl.
G06F 16/00 (2019.01)
G06F 16/2452 (2019.01)
G06F 16/248 (2019.01)

(52) U.S. Cl.
CPC ...... G06F 16/24522 (2019.01); G06F 16/248 (2019.01)

(58) Field of Classification Search
CPC .......................... G06F 16/24522; G06F 16/248
USPC ........................................................ 707/722
See application file for complete search history.

(56) References Cited

U.S. PATENT DOCUMENTS

2024/0265041 A1* 8/2024 Rennie .............. G06F 16/24522
2026/0030283 A1* 1/2026 Webster .............. G06F 16/3344

* cited by examiner

*Primary Examiner* — Chelcie L Daye
(74) *Attorney, Agent, or Firm* — Trupti P. Joshi

(57) ABSTRACT

A real-time system for generating Structured Query Language (SQL) queries from natural language input includes a server in communication with a large language model (LLM). The server is configured to: receive a natural language input from a user; generate a prompt that includes a terse table name or column name from the database, and instructions for generating an SQL query for the database, based on the natural language input. The processor is further configured to: replace the terse table name or column name with a verbose table name or column name; send the prompt to the LLM; receive an SQL query from the LLM, including the at least one verbose table name or column name; replace the at least one verbose table name or column name with the at least one terse table name or column name; execute the SQL query on the database; and receive an SQL query result.

20 Claims, 12 Drawing Sheets

100

610 Input user question

620 Receive DB schema

630 Replace table and column names with values from predefined dictionary

640 Ask to generate SQL based on user input

650 LLM

660 Replace back values in generated SQL by using the same dictionary

670 Execute SQL

680 Return result

600

810

820

830

840

850

860

870

Input user question

Receive DB schema, instructions, and SQL examples

Replace placeholders for time and rows limit inside of instructions and examples Ask to generate SQL based on user input

LLM

Execute SQL

Return result

800

METHODS TO FINE TUNE SIMPLE QUERY LANGUAGE GENERATION FROM NATURAL LANGUAGE INPUT

COPYRIGHT NOTICE

TECHNICAL FIELD

The subject matter described herein relates to devices, systems, and methods for generating simple query language (SQL) queries from natural language inputs using large language models (LLMs). This improved SQL generation system has particular but not exclusive utility for fraud analysis and management of contact centers.

BACKGROUND

Three critical problems currently exist in generating SQL queries from natural language using LLMs: (1) Schema Naming Complexity. Internal database schemas often use technical, abbreviated, terse, or non-intuitive names (e.g., "iSwitchID"). These names are difficult for LLMs to interpret correctly, leading to invalid queries. Users and LLMs struggle to map business concepts to technical database structures. (2) Mandatory Constraints Management. Business rules often require specific constraints (time limitations, row limits). LLMs often miss these mandatory constraints, and yet without proper constraints, queries may return irrelevant or excessive data. (3) Inconsistent Query Parameters. Users rarely specify explicit limits in their natural language questions. Default limitations need to be consistently applied, but LLMs struggle to automatically apply these business rules without explicit guidance.

It is to be appreciated that currently existing SQL generation systems have numerous drawbacks, including those described above. Accordingly, a need exists for improved SQL generation systems that address the foregoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is an improved SQL generation system based on three distinct methods that operate together: a name translation dictionary (to create a mapping between technical schema names and descriptive business terminology), time constraint validation (to ensure compliance with business and technical rules/limits regarding data timeframes), and dynamic value templates (to provide the LLM with SQL examples using placeholder values for default values such as row limits).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a real-time system for generating structured query language (SQL) queries from natural language input. The real-time system also includes a language server having at least one processor and a non-transitory computer readable medium operably coupled thereto, the server being in electronic communication with a large language model (LLM), the server being configured to receive a natural language input from a user, send a prompt to the LLM, and receive an SQL query from the LLM. The processor may include a graphical user interface (GUI), an SQL interpreter, a prompt generation service, and a prompt refinement service, the server being in electronic communication with a database. The computer readable medium may include a plurality of instructions stored in association therewith that are accessible to, and executable by, the processor, to perform operations. The operations may include: with the GUI, receiving the natural language input from the user; with the prompt generation service, the natural language input, and the database, generating a prompt, where the prompt may include at least one terse table name or column name from the database, and instructions for generating an SQL query for the database, based on the natural language input. The operations also include: with the prompt refinement service, within the prompt, replacing the at least one terse table name or column name with at least one verbose table name or column name; sending the prompt to the LLM; receiving the SQL query from the LLM, where the SQL query includes the at least one verbose table name or column name; within the SQL query, replacing the at least one verbose table name or column name with the at least one terse table name or column name; with the SQL interpreter, executing the SQL query on the database; and from the SQL interpreter, receiving an SQL query result. Other embodiments of this aspect include corresponding computer systems, apparatus, and computer programs recorded on one or more computer storage devices, each configured to perform the actions of the methods.

Implementations may include one or more of the following features. In some embodiments, the operations may further include: adding, to the prompt, an instruction or SQL example that includes a time limit placeholder or row limit placeholder; and replacing the time limit placeholder with a time limit or the row limit placeholder with a row limit. In some embodiments, the operations may further include: determining whether the SQL query includes a condition on a timestamp column; and if the SQL query does not include the condition on the timestamp column: revising the prompt to instruct the LLM to include the condition on the timestamp column; and sending the revised prompt to the LLM. In some embodiments, the operations may further include: if the SQL query result includes an exception or error message: revising the prompt to include the exception or error message; sending the revised prompt to the LLM; receiving the revised SQL query from the LLM; with the SQL interpreter, executing the revised SQL query on the database; and from the SQL interpreter, receiving a revised SQL query result. In some embodiments, the operations may further include: based on the SQL query result, generating a graph or table; and with the GUI, displaying the graph or table to the user. In some embodiments, the operations may further include: based on the SQL query result, generating a second prompt instructing the LLM to explain the SQL query result; sending the second prompt to the LLM; receiving an LLM response; and with the GUI, displaying the LLM response. In some embodiments, the at least one terse table name or column name from the database is identified via a schema of the database, where the schema of the database is included in the prompt. In some embodiments, replacing the at least one terse table name or column name with the at least one verbose table name or column name results in higher accuracy for the LLM in generating an SQL query with valid syntax. In some embodiments, replacing the at least one terse table name or column name with the at least one verbose table name or column name results in faster execution time for the SQL query. In some embodiments, replacing the at least one terse table name or column name with the at least one verbose table name or column name results in an improvement, within the SQL query generated by the LLM, in the relevance of selected table and column names. Implementations of the described techniques may include hardware, a method or process, or computer software on a computer-accessible medium.

One general aspect includes a computer-implemented method for generating Structured Query Language (SQL) queries from natural language input. A language server has at least one processor and a non-transitory computer readable medium operably coupled thereto, the server being in electronic communication with a large language model (LLM), the server being configured to receive a natural language input from a user, send a prompt to the LLM, and receive an SQL query from the LLM. The processor may include a graphical user interface (GUI), an SQL interpreter, a prompt generation service, and a prompt refinement service, the server being in electronic communication with a database. The method includes: with the GUI, receiving the natural language input from the user; with the prompt generation service, the natural language input, and the database, generating a prompt, where the prompt may include: at least one terse table name or column name from the database; and instructions for generating an SQL query for the database, based on the natural language input. The method also includes: with the prompt refinement service, within the prompt, replacing the at least one terse table name or column name with at least one verbose table name or column name; sending the prompt to the LLM; receiving the SQL query from the LLM, where the SQL query includes the at least one verbose table name or column name; within the SQL query, replacing the at least one verbose table name or column name with the at least one terse table name or column name; with the SQL interpreter, executing the SQL query on the database; and from the SQL interpreter, receiving an SQL query result. Other embodiments of this aspect include corresponding computer systems, apparatus, and computer programs recorded on one or more computer storage devices, each configured to perform the actions of the methods.

Implementations may include one or more of the following features. In some embodiments, the operations may further include: adding, to the prompt, an instruction or SQL example that includes a time limit placeholder or row limit placeholder; and replacing the time limit placeholder with a time limit or the row limit placeholder with a row limit. In some embodiments, the operations may further include: determining whether the SQL query includes a condition on a timestamp column; and if the SQL query does not include the condition on the timestamp column: revising the prompt to instruct the LLM to include the condition on the timestamp column; and sending the revised prompt to the LLM.

In some embodiments, the operations may further include: if the SQL query result includes an exception or error message: revising the prompt to include the exception or error message; sending the revised prompt to the LLM; receiving the revised SQL query from the LLM; with the SQL interpreter, executing the revised SQL query on the database; and from the SQL interpreter, receiving a revised SQL query result. In some embodiments, the operations may further include: based on the SQL query result, generating a graph or table; and with the GUI, displaying the graph or table to the user. In some embodiments, the operations may further include: based on the SQL query result, generating a second prompt instructing the LLM to explain the SQL query result; sending the second prompt to the LLM; receiving an LLM response; and with the GUI, displaying the LLM response. In some embodiments, the at least one terse table name or column name from the database is identified via a schema of the database, and where the schema of the database is included in the prompt. In some embodiments, replacing the at least one terse table name or column name with the at least one verbose table name or column name results in higher accuracy for the LLM in generating an SQL query with valid syntax. In some embodiments, replacing the at least one terse table name or column name with the at least one verbose table name or column name results in faster execution time for the SQL query. In some embodiments, replacing the at least one terse table name or column name with the at least one verbose table name or column name results in an improvement, within the SQL query generated by the LLM, in the relevance of selected table and column names. Implementations of the described techniques may include hardware, a method or process, or computer software on a computer-accessible medium.

The improved SQL generation system disclosed herein has particular, but not exclusive, utility for fraud analysis and management of contact centers.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the improved SQL generation system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
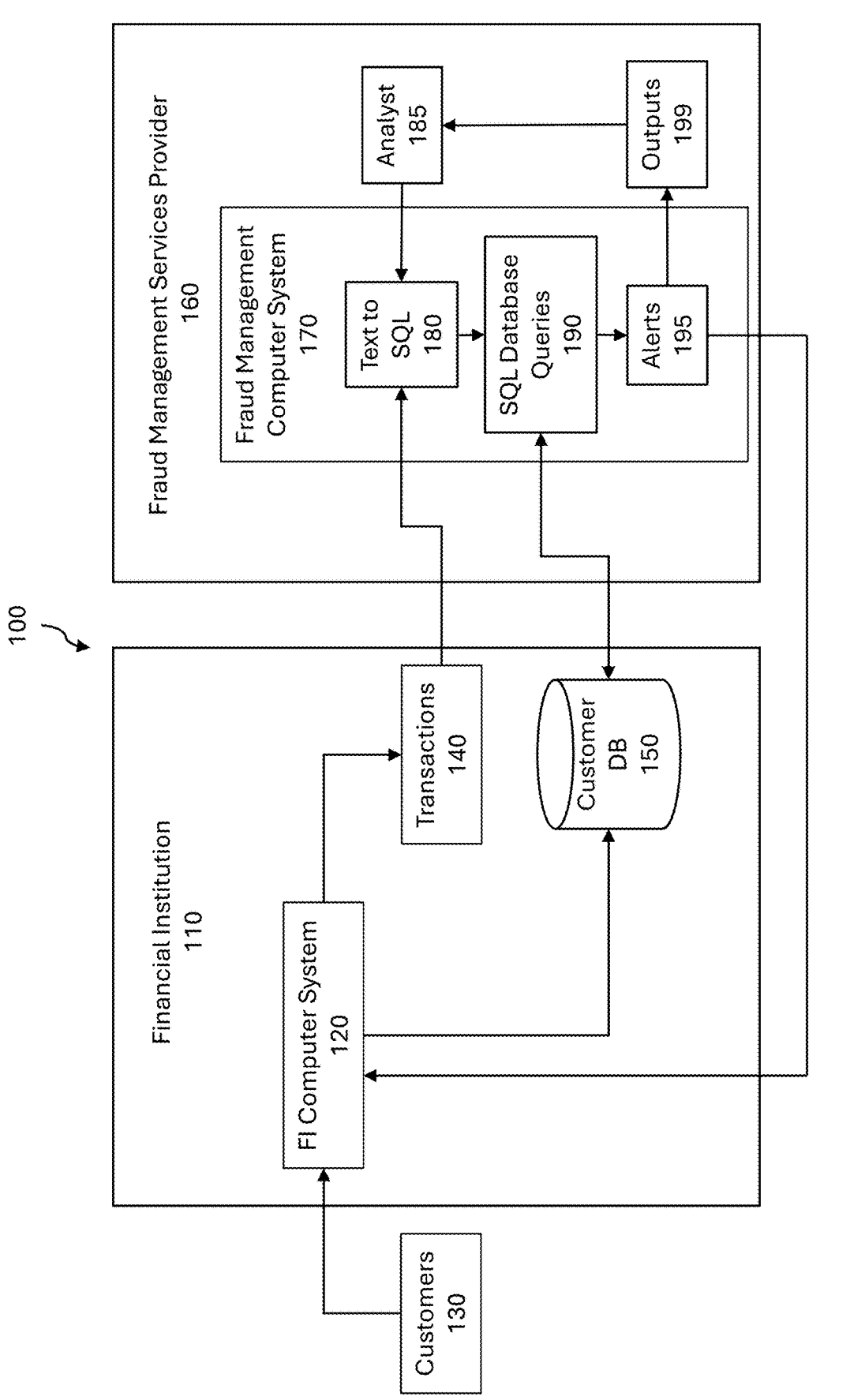
FIG. 1 is an exemplary representation, in block diagram form, of a fraud management system, in accordance with at least one embodiment of the present disclosure.

In accordance with at least one embodiment of the present disclosure, an improved SQL generation system is provided based on three distinct methods working together to enhance processing speed and accuracy: a name translation dictionary (to create a mapping between technical schema names and descriptive business terminology), time constraint validation (to ensure compliance with business and technical rules/limits regarding data timeframes), and dynamic value templates (to provide the LLM with SQL examples using placeholder values for default values such as row limits).

The improved SQL generation system includes a name translation dictionary, which creates a mapping between technical schema names and descriptive business terms, transforms the schema before LLM processing (e.g., "iSwitchID"→"IdentificatorOfTheSwitchRelatedToInteraction"), and then reverses the transformation after SQL generation to maintain database compatibility. The improved SQL generation system also includes time constraint validation, which automatically identifies timestamp columns in the schema, validates the presence of time constraints in generated queries, and prompts the LLM to add missing time constraints when necessary. This ensures compliance with business rules and technical constraints regarding data timeframes. The improved SQL generation system also includes dynamic value templates, which provide SQL examples with placeholder values (e.g., <DEFAULT_ROWS_LIMIT>) to demonstrate proper constraint usage in various query contexts, ensure consistent application of default limits, and help maintain query standardization across different user inputs.

Existing approaches to the problem of SQL generation from natural language inputs include direct translation from natural language to SQL. However, this approach provides no consideration for schema complexity, and lacks any mechanism for business rule enforcement. Similarly, providing detailed schema information to the LLM is resource-intensive and inflexible, and does not address dynamic constraint requirements. Another existing approach is to use query templates (e.g., fixed templates for common queries). This provides limited flexibility, and cannot handle varied user inputs.

Conversely, the improved SQL generation system of the present disclosure provides a multi-layered approach that combines schema transformation, constraint validation, and dynamic templates, thus creating a comprehensive solution for accurate SQL generation. This approach facilitates automatically enforcing business rules without explicit user input, and maintains consistency while allowing flexibility in what rules are applied and/or how they are applied. Adaptive schema handling provides dynamic translation between technical and business terms, and preserves database compatibility while improving LLM understanding.

The present disclosure provides significant value through potential integration with existing and future products, and provides customer benefits including improved query accuracy and reliability, reduced errors and invalid queries, enforced compliance with business rules, and enhanced user experience for non-technical users. These capabilities are of use to anyone who needs a solution for converting natural language input into SQL queries accurately and efficiently.

The main processing flow for the improved SQL generation system includes input processing including: a. receiving a natural language query from the user, b. loading the current schema and name dictionary, and c. transforming the schema using the name translation system. Next comes prompt preparation, including: a. loading instruction templates with placeholders for default values, b. loading relevant example queries with matching placeholders, c. validating consistency of placeholder usage between instructions and examples, and d. transforming schema names in the LLM instructions and examples.

The next step is initial query generation, including preparing the LLM prompt with transformed schema, instructions containing default value placeholders, example queries demonstrating placeholder usage in similar contexts. The system then generates an initial SQL query using the LLM. Query enhancement then involves parsing the generated SQL query. The system validates time constraints by identifying relevant timestamp columns, checking for existing time constraints, and adding or modifying constraints as needed. In a process limits validation step, the system then checks for explicit limit specifications in the user query, replaces placeholders with configured default values where needed, and validates that all required constraints are present. A name resolution step converts descriptive business names back to internal schema names, and validates that all names have proper mappings. A final validation check then verifies that the query used correct SQL syntax, confirms that all placeholders have been replaced with actual values, and checks query complexity and resource usage.

The system may also provide error handling. For example, in the case of invalid name mappings, the system may return an error message with suggested corrections. A user may receive that and select from the suggested corrections, or even provide an alternative response to address the invalid name mapping. In the case of missing time constraints, the system may trigger a rewrite that includes explicit constraints. In the case of unresolved placeholders, the system may apply configured defaults and issue a warning message. In the case of schema validation failures, the system may log the error and request query regeneration. In the case of placeholder consistency errors, the system may issue an alert on template configuration issues.

The improved SQL generation system may also include configuration management features to maintain separate configurations per environment or tenant, allow override of default values at runtime, support dynamic updates to the name dictionary and templates, enable or disable specific constraints based on context, and manage placeholder definitions and their default values.

The system is designed to be extensible, allowing for the addition of new placeholder types, custom validation rules, integration with existing query optimization systems, support for multiple database dialects, and extension of example query libraries. The architecture described herein helps ensure that generated SQL queries use correct database object names, include appropriate time constraints, apply consistent default values through placeholder resolution, and follow business rules and best practices. The solution improves query accuracy by reinforcing limit and constraint requirements through consistent placeholder usage in both instructions and examples, while maintaining flexibility for different use cases and database environments.

Key changes from existing systems are focused on:
1. Adding explicit placeholder management in prompt preparation
2. Emphasizing the consistency between instructions and examples
3. Adding placeholder-specific validation and error handling
4. Expanding configuration management to include placeholder definitions 5. Adding placeholder resolution to the query enhancement process To validate the effectiveness of the improved SQL generation system, comparative testing was conducted using a tool for evaluating different prompts and LLMs based on a prepared list of questions.

Here is an example prompt template using current methods:

You are an AI assistant to a data analyst, creating <SQL_DIALECT> SQL queries to get data from a database. Here is the description of the database schema: <DATABASE_SCHEMA>

Generate SQL query based on the schema above to answer the question asked in prompt, while following these rules:

If the question can be answered based on the schema, reply with only the SQL in <SQL_DIALECT> dialect and nothing else, otherwise reply with "no can do".

Use only the tables and columns mentioned in the schema.

Limit the number of results by <DEFAULT_ROWS_LIMIT> if limit is not explicitly stated in the question.

Limit the timeframe by no older than <DEFAULT_TIME_LIMIT> days if time limit is not explicitly stated in the question.

Here are some examples:
1.

User question: Find the average handle time for each agent.
Reply:

```
SELECT AgentId, AgentName, AVG(HandleTime) AS AvgHandleTime
FROM AgentContacts
WHERE StartTimestamp >= DATEADD(DAY, -< DEFAULT_TIME_LIMIT>,
CURRENT_DATE( ))
GROUP BY AgentId, AgentName
ORDER BY AvgHandleTime
LIMIT <DEFAULT_ROWS_LIMIT>;
2.
```

2.

User question: List the top 10 agents with the most outbound calls last month.
Reply:

```
SELECT AgentId, AgentName, COUNT(AgentContactId) AS OutboundCallCount
FROM AgentContacts
WHERE OutboundFlag = 1 AND
    StartTimestamp >= DATE_TRUNC('MONTH', CURRENT_DATE( ) - INTERVAL '1
MONTH') AND
    StartTimestamp < DATE_TRUNC('MONTH', CURRENT_DATE( ))
GROUP BY AgentId, AgentName
ORDER BY OutboundCallCount DESC
LIMIT 10;
3.
```

User question: List the top 3 agents with the most outbound calls past month.
Reply:

```
SELECT AgentId, AgentName, COUNT(AgentContactId) AS OutboundCallCount
FROM AgentContacts
WHERE OutboundFlag = 1 AND
    StartTimestamp >= DATE_TRUNC('MONTH', CURRENT_DATE( ) - INTERVAL 'I
MONTH') AND
    StartTimestamp < DATE_TRUNC('MONTH', CURRENT_DATE( ))
```

-continued

```
GROUP BY AgentId, AgentName
ORDER BY OutboundCallCount DESC
LIMIT 3;
```

Here is an example prompt generated according to the methods disclosed herein:

You are an AI assistant to a data analyst, creating Snowflake SQL queries to get data from a database. Here is the description of the database schema:

```
CREATE TABLE Calls(ActiveListeningIndexScore Number
AgentName Varchar
ContactNumber Number
AgentTenureInMonths Number
BeEmpatheticIndexScore Number
BuildRapportIndexScore Number
CallDurationInSeconds Number
CallReason Varchar
DemonstrateOwnershipIndexScore Number
CallId Varchar
```

-continued

```
CallStartTimestamp Timestamp_LTZ
SetExpectationIndexScore Number
SkillId Number
SkillName Varchar
TeamId Varchar
TeamName Varchar
AgentId Varchar
AcknowledgeLoyaltyIndexScore Number
EffectiveQuestioningIndexScore Number
InappropriateActionIndexScore Number
PromoteSelfServiceIndexScore Number
IsResolved Number
CustomerSentimentIndexScore Number)
CREATE TABLE Outcomes(OutcomeId Number
OutcomeName Varchar)
CREATE TABLE CallToOutcome(CallId Varchar
OutcomeId Number)
```

Generate SQL query based on the schema above to answer the question asked in prompt, while following these rules:

If the question can be answered based on the schema, reply with only the SQL in Snowflake dialect and nothing else, otherwise reply with "no can do".

Use only the tables and columns mentioned in the schema.

Limit the number of results by 20 if limit is not explicitly stated in the question.

Limit the timeframe by no older than 7 days if time limit is not explicitly stated in the question.

Here are some examples:

1.
User question: Find the average handle time for each agent.

Reply:

```
SELECT AgentId, AgentName, AVG(HandleTime) AS AvgHandleTime
FROM AgentContacts
WHERE StartTimestamp >= DATEADD(DAY, -7, CURRENT_DATE( ))
GROUP BY AgentId, AgentName
ORDER BY AvgHandleTime
LIMIT 20;
```

2.

User question: List the top 10 agents with the most outbound calls last month.

Reply:

```
SELECT AgentId, AgentName, COUNT(AgentContactId) AS OutboundCallCount
FROM AgentContacts
WHERE OutboundFlag = 1 AND
   StartTimestamp >= DATE_TRUNC('MONTH', CURRENT_DATE( ) - INTERVAL '1
MONTH') AND
   StartTimestamp < DATE_TRUNC('MONTH', CURRENT_DATE( ))
GROUP BY AgentId, AgentName
ORDER BY OutboundCallCount DESC
LIMIT 10;
```

3.

User question: List the top 3 agents with the most outbound calls past month.

Reply:

```
SELECT AgentId, AgentName, COUNT(AgentContactId)
AS OutboundCallCount
FROM AgentContacts
WHERE OutboundFlag = 1 AND
   StartTimestamp >= DATE_TRUNC('MONTH', CURRENT_DATE( ) -
INTERVAL '1 MONTH') AND
   StartTimestamp < DATE_TRUNC('MONTH', CURRENT_DATE( ))
GROUP BY AgentId, AgentName
ORDER BY OutboundCallCount DESC
LIMIT 3;
```

As shown above, the first prompt contains original technical schema names, and limits that are hardcoded and do not correspond to the values in the rules. The second prompt does not include these deficiencies.

Here are some example results:

1) Question: Show Me Top 10 Call Reasons

Results received without the fine-tuning method:

```
SELECT*
FROM CALL_SEGMENT_VIEW_V001
WHERE SEGMENT_START_TIMESTAMP >= DATEADD(DAY, -7,
CURRENT_TIMESTAMP( ))
ORDER BY SEGMENT_DURATION_SECONDS DESC
LIMIT 20;
```

Execution time: 5.652041499968618

Results received with the fine-tuning method:

```
SELECT CallReason, COUNT(*) AS CallCount
FROM Calls
WHERE CallStartTimestamp >= DATEADD(DAY, -7,
CURRENT_TIMESTAMP( ))
GROUP BY CallReason
ORDER BY CallCount DESC
LIMIT 10;
Execution time: 2.4271690999739803
```

2) Question: What are the Top Ten Call Reasons for Last 10 Months?

Results received without the fine-tuning method:

```
    SEGMENT_ID,
    INTENT_NAME,
    COUNT(*) AS CALL_COUNT
FROM
    CALL_SEGMENT_VIEW_V001
WHERE
    SEGMENT_START_TIMESTAMP >= DATEADD
(MONTH, -10, CURRENT_TIMESTAMP( ))
GROUP BY
    SEGMENT_ID,
    INTENT_NAME
ORDER BY
    CALL_COUNT DESC
LIMIT 10;
Execution time: 5.081300599966198
```

Results received with the fine-tuning method:

```
SELECT CallReason, COUNT(*) AS CallCount
FROM Calls
WHERE CallStartTimestamp >= DATEADD(MONTH,
-10, CURRENT_TIMESTAMP( ))
GROUP BY CallReason
ORDER BY CallCount DESC
LIMIT 10;
Execution time: 1.9607014000066556
```

3) Question: Resolved Percentage in the 3 Teams with the Highest CSAT

Results received without the fine-tuning method:

```
SELECT
    TEAM_NAME,
    ROUND(SUM(CASE WHEN RESOLVED_FLAG = 1 THEN 1
ELSE 0 END) * 100.0/COUNT(*), 2) AS RESOLVED_PERCENTAGE
FROM
    CALL_SEGMENT_VIEW_V001
GROUP BY
    TEAM NAME
```

-continued

```
ORDER BY
    RESOLVED_PERCENTAGE DESC
LIMIT 3;
Execution time: 2.7607145000365563
```

Results received with the fine-tuning method:

```
SELECT
    TeamName,
    ROUND(100.0 * SUM(CASE WHEN IsResolved = 1 THEN 1 ELSE
0 END)/COUNT(*), 2) AS ResolvedPercentage
FROM Calls
WHERE CallStartTimestamp >= DATEADD(DAY, -7,
CURRENT_TIMESTAMP( ))
GROUP BY TeamName
ORDER BY CustomerSentimentIndexScore DESC
LIMIT 3;
Execution time: 6.633792700013146
```

4) Question: What were the Outcomes for the Top 15 Call Reasons for the Past 15 Weeks?

Results received without the fine-tuning method:

```
SELECT top 15 INTENT_NAME, AUTOSUMMARY_OUT-
COME_NAME, COUNT(*)
AS OUTCOME_COUNT
FROM CALL_SEGMENT_VIEW_V001 csv
JOIN SEGMENT_AUTOSUMMARY_OUTCOME_ASSOCI-
ATION_VIEW_V001 saoa
    ON csv.SEGMENT_ID = saoa.SEGMENT_ID
JOIN AUTOSUMMARY_OUTCOME_DIM_VIEW_V001 aod
    ON saoa.AUTOSUMMARY_OUTCOME_KEY =
aod.AUTOSUMMARY_OUTCOME_KEY
WHERE csv.SEGMENT_START_TIMESTAMP >= DATEADD(WEEK,
-15, CURRENT_TIMESTAMP( ))
GROUP BY INTENT_NAME, AUTOSUMMARY_OUTCOME_NAME
ORDER BY OUTCOME_COUNT DESC
LIMIT 20;
Execution time: 3.9585120999836363
```

Results received with the fine-tuning method:

```
SELECT cr.CallReason, o.OutcomeName, COUNT(cto.CallId)
AS CallCount
FROM Calls c
JOIN CallToOutcome cto ON c.CallId = cto.CallId
JOIN Outcomes o ON cto. OutcomeId = 0.OutcomeId
WHERE c.CallStartTimestamp >= DATEADD(WEEK, -15,
CURRENT_TIMESTAMP( ))
GROUP BY cr.CallReason, o.OutcomeName
ORDER BY CallCount DESC
LIMIT 15;
Execution time: 6.049622200021986
```

5) Question: What are the Top 5 Call Reasons?
Results received without the fine-tuning method:

```
SELECT
    CALL_SEGMENT_VIEW_V001.SEGMENT_ID,
    CALL SEGMENT VIEW_V001.SEGMENT_START_TIMESTAMP,
    CALL_SEGMENT_VIEW_V001.SEGMENT_DURATION_SECONDS,
    CALL_SEGMENT_VIEW_V001.INTENT_NAME,
    CALL_SEGMENT_VIEW_V001.AGENT_NAME,
    CALL_SEGMENT_VIEW_V001.SKILL_NAME,
    CALL_SEGMENT_VIEW_V001.TEAM_NAME,
AUTOSUMMARY_OUTCOME_DIM_VIEW_V001.AUTOSUMMARY_OUTCOME_NAME
FROM CALL_SEGMENT_VIEW_V001
JOIN SEGMENT_AUTOSUMMARY_OUTCOME_ASSOCIATION_VIEW_V001
```

-continued

```
ON CALL_SEGMENT_VIEW_V001.SEGMENT_ID =
SEGMENT_AUTOSUMMARY_OUTCOME_ASSOCIATION_VIEW_V001.SEGMENT_ID
JOIN AUTOSUMMARY_OUTCOME_DIM_VIEW_V001
  ON
SEGMENT_AUTOSUMMARY_OUTCOME_ASSOCIATION_VIEW_V001.AUTOSUM
MARY_OUTCOME_KEY =
AUTOSUMMARY_OUTCOME_DIM_VIEW_V001.AUTOSUMMARY_OUTCOME_KEY
WHERE CALL_SEGMENT_VIEW_V001.SEGMENT_START_TIMESTAMP >=
DATEADD(MONTH, -7, CURRENT_TIMESTAMP( ))
Execution time: 10.524730600009207
```

Results received with the fine-tuning method:

```
SELECT CallReason, COUNT(*) AS CallCount
FROM Calls
WHERE CallStartTimestamp >= DATEADD(DAY, –7,
CURRENT_TIMESTAMP( ))
GROUP BY CallReason
ORDER BY CallCount DESC
LIMIT 5;
Execution time: 2.956204499991145
```

6) Question: Show Me Number of Calls Per Each Last 4 Months. I Need it with Month Names Instead of Timestamps Results received without the fine-tuning method:

```
SELECT
  MONTH_NAME(DATE_TRUNC('MONTH', SEG-
MENT_START_TIMESTAMP)) AS MONTH,
    COUNT(*) AS CALL_COUNT
FROM
  CALL_SEGMENT_VIEW_V001
  WHERE
    SEGMENT_START_TIMESTAMP >= DATEADD
(MONTH, –4, CURRENT_DATE( )) GROUP BY
    MONTH_NAME(DATE_TRUNC('MONTH', SEG-
MENT_START_TIMESTAMP)) ORDER BY
    MONTH DESC
LIMIT 20;
Execution time: 6.2923460000311024
```

Results received with the fine-tuning method:

```
SELECT
  CASE
    WHEN MONTH(CallStartTimestamp) = 1 THEN 'January'
    WHEN MONTH(CallStartTimestamp) = 2 THEN 'February'
    WHEN MONTH(CallStartTimestamp) = 3 THEN 'March'
    WHEN MONTH(CallStartTimestamp) = 4 THEN 'April'
    WHEN MONTH(CallStartTimestamp) = 5 THEN 'May'
    WHEN MONTH(CallStartTimestamp) = 6 THEN 'June'
    WHEN MONTH(CallStartTimestamp) = 7 THEN 'July'
    WHEN MONTH(CallStartTimestamp) = 8 THEN 'August'
    WHEN MONTH(CallStartTimestamp) = 9 THEN 'September'
    WHEN MONTH(CallStartTimestamp) = 10 THEN 'October'
    WHEN MONTH(CallStartTimestamp) = 11 THEN 'November'
    ELSE 'December'
  END AS Month,
  COUNT(*) AS NumCalls
FROM Calls
WHERE CallStartTimestamp >= DATEADD(MONTH, –4,
CURRENT_DATE( ))
GROUP BY MONTH(CallStartTimestamp)
ORDER BY MONTH(CallStartTimestamp) DESC
LIMIT 4;
Execution time: 5.684668500034604
```

7) Question: Show Me Number of Calls Per Each Last 6 Months

Results received without the fine-tuning method:

```
SELECT
  DATE_TRUNC('MONTH', SEGMENT_START_TIMESTAMP) AS
  MONTH, COUNT(DISTINCT SEGMENT_ID) AS CALL_COUNT
FROM CALL_SEGMENT_VIEW_V001
WHERE SEGMENT_START_TIMESTAMP >= DATEADD('MONTH',
–6, CURRENT_DATE( ))
GROUP BY DATE_TRUNC('MONTH', SEGMENT_START_TIME-
STAMP)
ORDER BY MONTH DESC
LIMIT 6;
Execution time: 2.829386900004465
```

Results received with the fine-tuning method:

```
SELECT
  DATE_TRUNC('MONTH', CallStartTimestamp) AS
  CallMonth. COUNT(*) AS NumCalls
FROM Calls
WHERE CallStartTimestamp >= DATEADD('MONTH', –6,
CURRENT_DATE( ))
GROUP BY DATE_TRUNC('MONTH', CallStartTimestamp)
ORDER BY CallMonth DESC;
Execution time: 2.765125700039789
```

8) Question: What is the CSAT?

Results received without the fine-tuning method:

```
SELECT
  csvv.SEGMENT_ID,
  csvv.SEGMENT_DURATION_SECONDS,
  csvv.INTENT_NAME,
  csvv.SKILL_NAME,
  csvv.TEAM_NAME,
  csvv.AGENT_NAME,
  csvv.AGENT_TENURE_MONTHS,
  csvv.BE_EMPATHETIC_INDEX_SCORE,
  csvv.BUILD_RAPPORT_INDEX_SCORE,
  csvv.DEMONSTRATE_OWNERSHIP_INDEX_SCORE,
  csvv.SET_EXPECTATIONS_INDEX_SCORE,
  csvv.ACKNOWLEDGE_LOYALTY_INDEX_SCORE,
  csvv.EFFECTIVE_QUESTIONING_INDEX_SCORE,
  csvv.INAPPROPRIATE_ACTION_INDEX_SCORE,
  csvv.PROMOTE_SELF_SERVICE_INDEX_SCORE,
  csvv.RESOLVED_FLAG,
  csvv.ENLIGHTEN_SENTIMENT_INDEX_SCORE,
  csvv.ACTIVE_LISTENING_INDEX_SCORE,
  aodvv.AUTOSUMMARY_OUTCOME_NAME
FROM CALL_SEGMENT_VIEW_V001 csvv
LEFT JOIN SEGMENT_AUTOSUMMARY_OUT-
COME_ASSOCIATION_VIEW_V001 saoavv
  ON csvv.SEGMENT_ID = saoavv.SEGMENT_ID
LEFT JOIN AUTOSUMMARY_OUT-
COME_DIM_VIEW_V001 aodvv
  ON saoavv.AUTOSUMMARY_OUTCOME_KEY =
  aodvv.AUTOSUMMARY_OUTCOME_KEY
```

-continued

```
WHERE csvv.SEGMENT_START_TIMESTAMP >=
DATEADD(MONTH, -7, CURRENT_TIMESTAMP( ));
Execution time: 18.63382550003007
```

Results received with the fine-tuning method:

```
SELECT c.CallId, c.CallReason, c.CallDurationInSeconds,
o.OutcomeName
FROM Calls c
JOIN CallToOutcome cto ON c.CallId = cto.CallId
JOIN Outcomes o ON cto.OutcomeId = o.OutcomeId
WHERE c.CallStartTimestamp >= DATEADD(month, -7,
CURRENT_TIMESTAMP( ))
LIMIT 20;
Execution time: 5.080585699994117
```

9) Question: What are My Top Ten Call Reasons by Sentiment

Results received without the fine-tuning method:

```
SELECT AUTOSUMMARY_OUTCOME_NAME,
AVG(ENLIGHTEN_SENTIMENT_INDEX_SCORE)
AS AVG_SENTIMENT_SCORE FROM
CALL_SEGMENT_VIEW_V001
JOIN SEGMENT_AUTOSUMMARY_OUTCOME_ASSO-
CIATION_VIEW_V001
    ON CALL_SEGMENT_VIEW_V001.SEGMENT_ID =
SEGMENT_AUTOSUMMARY_OUTCOME_ASSO-
CIATION_VIEW_V001.SEGMENT_ID
JOIN AUTOSUMMARY_OUTCOME_DIM_VIEW_V001
    ON
SEGMENT_AUTOSUMMARY_OUTCOME_ASSO-
CIATION_VIEW_V001.AUTOSUMMARY_OUT-
COME_KEY =
AUTOSUMMARY_OUTCOME_DIM_VIEW_V001.
AUTOSUMMARY_OUTCOME_KEY
WHERE SEGMENT_START_TIMESTAMP >=
DATEADD(DAY, -7, CURRENT_TIMESTAMP)
GROUP BY AUTOSUMMARY_OUTCOME_NAME
ORDER BY AVG_SENTIMENT_SCORE DESC
LIMIT 10;
Execution time: 4.365627199993469
```

Results received with the fine-tuning method:

```
SELECT CallReason, AVG(CustomerSentimentIndexScore)
AS AvgSentimentScore FROM Calls
WHERE CallStartTimestamp >= DATEADD(DAY, -7,
CURRENT_TIMESTAMP( ))
GROUP BY CallReason
ORDER BY AvgSentimentScore DESC
LIMIT 10;
Execution time: 3.5940937000559643
```

10) Question: Who are My Top 10 Best Agents by Behavior?

Results received without the fine-tuning method:

```
SELECT AGENT_NAME,
    ROUND(AVG(ACTIVE_LISTENING_INDEX_SCORE), 2) AS
ACTIVE_LISTENING_AVG,
    ROUND(AVG(BE_EMPATHETIC_INDEX_SCORE), 2) AS
BE_EMPATHETIC_AVG,
    ROUND(AVG(BUILD_RAPPORT_INDEX_SCORE), 2) AS
BUILD_RAPPORT_AVG,
    ROUND(AVG(DEMONSTRATE_OWNERSHIP_INDEX_SCORE),
2) AS DEMONSTRATE_OWNERSHIP_AVG,
    ROUND(AVG(SET_EXPECTATIONS_INDEX_SCORE), 2) AS
SET_EXPECTATIONS_AVG,
    ROUND(AVG(ACKNOWLEDGE_LOYALTY_INDEX_SCORE),
```

-continued

```
2) AS ACKNOWLEDGE_LOYALTY_AVG,
    ROUND(AVG(EFFECTIVE_QUESTIONING_INDEX_SCORE),
2) AS EFFECTIVE_QUESTIONING_AVG,
    ROUND(AVG(PROMOTE_SELF_SERVICE_INDEX_SCORE),
2) AS PROMOTE_SELF_SERVICE_AVG
FROM CALL_SEGMENT_VIEW_V001
WHERE SEGMENT_START_TIMESTAMP >= DATEADD
(DAY, -7, CURRENT_TIMESTAMP)
GROUP BY AGENT_NAME
ORDER BY ACTIVE_LISTENING_AVG DESC,
BE_EMPATHETIC_AVG DESC, BUILD_RAPPORT_AVG DESC,
DEMONSTRATE_OWNERSHIP_AVG DESC,
SET_EXPECTATIONS_AVG DESC,
ACKNOWLEDGE_LOYALTY_AVG DESC,
EFFECTIVE_QUESTIONING_AVG DESC,
PROMOTE_SELF_SERVICE_AVG DESC
LIMIT 10;
Execution time: 6.7344259999808855
```

Results received with the fine-tuning method:

```
SELECT AgentId, AgentName,
AVG(ActiveListeningIndexScore) AS ActiveListeningAvg,
AVG(BeEmpatheticIndexScore) AS BeEmpatheticAvg,
AVG(BuildRapportIndexScore) AS BuildRapportAvg,
AVG(DemonstrateOwnershipIndexScore) AS
DemonstrateOwnershipAvg,
AVG(SetExpectationIndexScore) AS SetExpectationAvg,
AVG(AcknowledgeLoyaltyIndexScore) AS AcknowledgeLoyaltyAvg,
AVG(EffectiveQuestioningIndexScore) AS EffectiveQuestioningAvg,
AVG(PromoteSelfServiceIndexScore) AS PromoteSelfServiceAvg
FROM Calls
WHERE CallStartTimestamp >= DATEADD
(DAY, -7, CURRENT_TIMESTAMP)
GROUP BY AgentId, AgentName
ORDER BY ActiveListeningAvg DESC, BeEmpatheticAvg
DESC, BuildRapportAvg DESC,
DemonstrateOwnershipAvg DESC, SetExpectationAvg DESC,
AcknowledgeLoyaltyAvg DESC, EffectiveQuestioningAvg DESC,
PromoteSelfServiceAvg DESC
LIMIT 10;
Execution time: 5.7976370000396855
```

11) Question: Show Me Top 10 Performing Agents with Respect to after Call Work And Average Handle Time and Hold Time Results received without the fine-tuning method:

```
SELECT TOP 10
AGENT_NAME,
AVG(SEGMENT_DURATION_SECONDS) AS
AVG_HANDLE_TIME,
SUM(CASE WHEN INTENT_NAME = 'After Call Work' THEN
SEGMENT_DURATION_SECONDS ELSE 0 END) / 3600.0 AS
AFTER_CALL WORK_HRS,
SUM(CASE WHEN INTENT_NAME = 'Hold' THEN
SEGMENT_DURATION_SECONDS ELSE 0 END) / 3600.0 AS
HOLD_TIME_HRS
FROM CALL_SEGMENT_VIEW_V001
WHERE SEGMENT_START_TIMESTAMP >= DATEADD
(DAY, -7, CURRENT_TIMESTAMP())
GROUP BY AGENT_NAME
ORDER BY AFTER_CALL_WORK_HRS ASC,
AVG_HANDLE_TIME ASC
LIMIT 20;
Execution time: 4.446596800000407
```

Results received with the fine-tuning method:

```
SELECT TOP 10
AgentName,
AVG(CallDurationInSeconds) AS AvgCallDuration,
AVG(HoldTimeInSeconds) AS AvgHoldTime,
AVG(AfterCallWorkTimeInSeconds) AS AvgAfterCallWorkTime
FROM Calls
WHERE CallStartTimestamp >= DATEADD
(DAY, -7, CURRENT_TIMESTAMP)
GROUP BY AgentName
ORDER BY AvgAfterCallWorkTime ASC;
Execution time: 5.894560799992178
```

As can be seen in the results, a number of factors are improved when using the fine-tuning method.

1. Time Constraint Management. Without the fine-tuning method, critical omissions are observed (e.g., Question 3 response missing mandatory time limit). With the fine-tuning method, all queries consistently contain time limitations based on column "CallStartTimestamp".

2. Row Limit Accuracy. Without the fine-tuning method, incorrect default value usage is observed (e.g., Question 1 using "LIMIT 20" when "top 10" was explicitly requested). With the fine-tuning method, the system correctly applies row limits as specified in the questions.

3. Column Selection Optimization. Without the fine-tuning method, over-selection issues are observed in Questions 1, 5, and 8, including usage of "SELECT*", unnecessary column inclusion, and excessive join operations. With the fine-tuning method, precise column selection matches the query requirements.

4. Query Consistency. Without the fine-tuning method, syntax errors and hallucinations are observed. For example, the responses to questions 4 and 11 contain contradictory limit clauses ("SELECT TOP {number}" with "LIMIT {number}"). In several cases, the legacy system also generated non-executable queries. However, with the fine-tuning method, the novel system produced consistent, executable SQL syntax.

These findings demonstrate the effectiveness of the invention's three core methods working together to produce more accurate and consistent SQL queries.

In addition, in 8 of 11 test cases (e.g., 73% of cases), the execution time of the query is less for the fine-tuned queries, by as much as 13 seconds, and in 8 of 11 test cases (e.g., 73% of cases), the query is simpler, shorter, and more human-readable.

Statistical Analysis of Test Results:

A total of 11 queries were analyzed, using a formula Accuracy=(Correct queries/Total queries)*100.

1. Schema Name Accuracy

Non fine-tuned results: Correct queries: 5 (Questions 2, 3, 6, 7, 9). Accuracy=(5/11)*100=45.4%.

Fine-tuned results: Correct queries: 11. Accuracy=100%.

2. Time Constraint Inclusion

Non fine-tuned results: Queries with correct time constraints: 7 (Questions 1, 2, 4, 6, 7, 9, 10). Accuracy=(7/11)*100=63.6%.

Fine-tuned results: Queries with correct time constraints: 10 (Questions 1-7, 9-11). Accuracy=(10/11)*100=90.9%.

3. Row Limit Accuracy

Non fine-tuned results: Correct limit implementation: 6 (Questions 2, 3, 6, 7, 9, 10). Accuracy=(6/11)*100=54.5%.

Fine-tuned results: Correct limit implementation: 11. Accuracy=100%.

4. Column Selection Efficiency

Non fine-tuned results: Queries with optimal column selection: 6 (Questions 2, 3, 4, 6, 7, 11). Efficiency=(6/11)* 100=54.5%.

Fine-tuned results: Queries with optimal column selection: 10 (Questions 1-7, 9-11). Efficiency=(10/11)* 100=90.9%.

5. Query Syntax Validity

Non fine-tuned results: Valid queries: 8 (Questions 1-3, 5-7, 9, 10). Validity=(8/11)*100=72.7%.

Fine-tuned results: Valid queries: 11. Validity=(11/11)* 100=100%.

Summary of Improvements:

1. Schema name accuracy: +54.6% improvement

2. Time constraint inclusion: +27.3% improvement

3. Row limit accuracy: +45.5% improvement

4. Column selection efficiency: +45.5% improvement

5. Query syntax validity: +27.3% improvement

This statistical analysis demonstrates significant improvements across all measured metrics when using the fine-tuning methods.

The most substantial improvements are seen in one or more of schema name accuracy, row limit accuracy, and column selection efficiency, and preferably all three, which directly addresses key problems the present disclosure aims to solve.

The present disclosure aids substantially in the automatic generation of SQL queries from natural language inputs, by improving the LLM's ability to conform with technical and business goals. Implemented on a processor in communication with a database, the improved SQL generation system disclosed herein provides practical reduction in the amount of time spent querying databases. This improved SQL generation transforms a natural language input into a fully functional SQL query, without the normally routine need to edit the query manually to achieve desired results. This unconventional approach improves the functioning of both the large language model and the processor running the large language model, by allowing the model to run faster and more efficiently while increasing the accuracy and consistency of results, thus also reducing energy consumption and the greenhouse gas emissions associated therewith.

The improved SQL generation system may be implemented as a process at least partly viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Outputs of the improved SQL generation system may be printed, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the improved SQL generation system. Certain features may be added, removed, or modified without departing from the spirit of the claimed subject matter. The terms "LLM" and "SQL", while specific to particular architectures, should be understood as exemplary. Any text generation tool that produces comparable results to an LLM may be used instead of or in addition to an LLM, and any database query language that produces comparable results to SQL (e.g., NoSQL) may be used instead of or in additional to SQL.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is an exemplary representation, in block diagram form, of a fraud management system 100, in accordance with at least one embodiment of the present disclosure. The fraud management system 100 includes a financial institution (FI) 110 and a fraud management services provider 160. The financial institution 110 includes an FI computer system 120 that receives input from customer 130 to populate a customer database 150 and generate transactions 140. The fraud management services provider 160 includes a fraud management computer system 170 which receives the transactions 140 and data from the customer database. In some embodiments, the fraud management computer system may employ a text-to-SQL generation system 180 to receive text inputs from an analyst 185 and turn them into SQL database queries 190 that query the customer database 150. Some queries 190 may generate alerts 195 and other outputs 199 that are sent back to the analyst 185.

Block diagrams are provided herein for exemplary purposes; a person of ordinary skill in the art will recognize myriad variations that nonetheless fall within the scope of the present disclosure. For example, any of the blocks described herein may optionally include an output to a user of information relevant to the block, and may thus represent an improvement in the user interface over existing art by providing information (whether static or dynamically updated) that is not otherwise available. Similarly, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Before continuing, it should be noted that the examples described above are provided for purposes of illustration, and are not intended to be limiting. Other devices and/or device configurations may be utilized to carry out the operations described herein.

Figure 2:
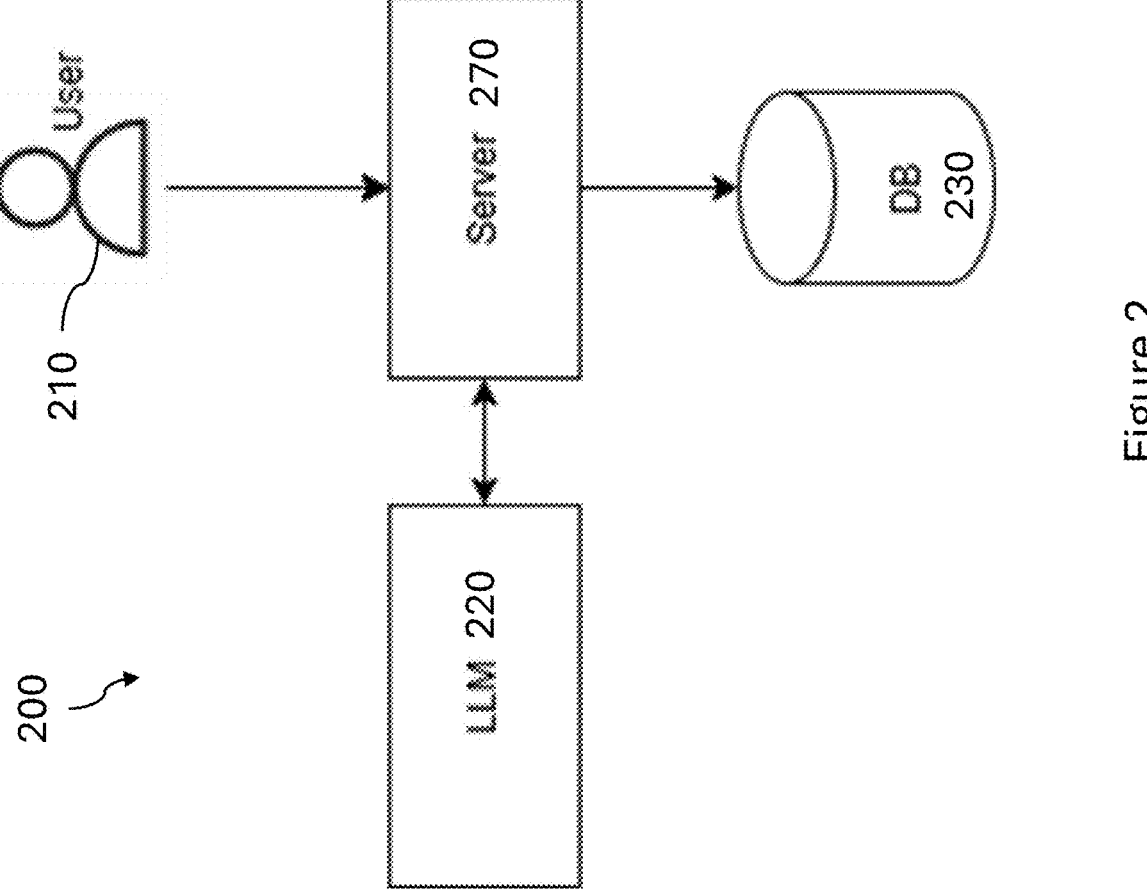
FIG. 2 is a schematic, diagrammatic representation of a hardware architecture for an improved SQL generation system, in accordance with at least one embodiment of the present disclosure.

FIG. 2 is a schematic, diagrammatic representation of a hardware architecture for an improved SQL generation system 200, in accordance with at least one embodiment of the present disclosure. A user 210 types or dictates text into a server 270, which is then used to generate a question for an LLM 220, which generates an SQL query that is used to query a database 230. In an example, the database 230 is an SQL database that includes business information, the LLM 220 is a large language model to be used to translate user input text to SQL, and the server 270 is a computer on which the main logic of the improved SQL generation system 200 runs. The system 200 may for example support a REST API on which users 210 request to query data by free text, may contain all configurations (DB schema, dictionaries, etc.), may connect to the LLM using the REST API and use it to translate a given text to SQL, and may connect to the database 230 to run the generated SQL query. Depending on the implementation, any LLM vendor can be used. For example, Amazon Web Services (AWS) may be used while hosting an LLM vendor such as AWS Bedrock or AWS Sagemaker. Depending on the implementation, the database may be any SQL-compatible database where the business information is stored, and could for example be AWS Aurora, SQL Server, or Snowflake.

Figure 3:
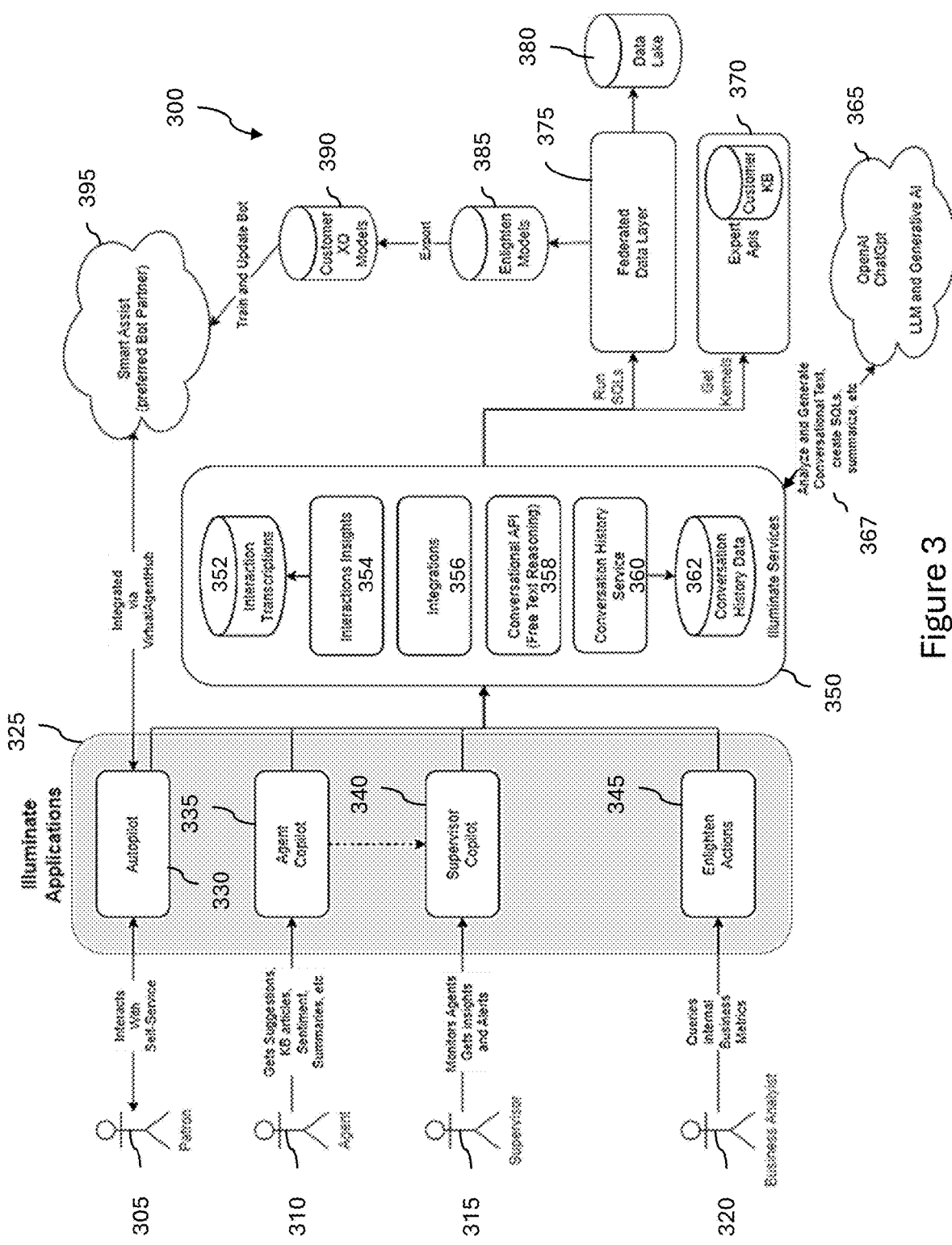
FIG. 3 is a schematic, diagrammatic representation of a software architecture of an example improved SQL generation system, in accordance with at least one embodiment of the present disclosure.

FIG. 3 is a schematic, diagrammatic representation of a software architecture 300 of an example improved SQL generation system, in accordance with at least one embodiment of the present disclosure. The present disclosure concerns an inner mechanism inside of a bigger ecosystem explained in this diagram.

In the example shown in FIG. 3, users 305, 310, 315, and 320 interact with LLM interface applications 325. A patron 305 interacts with an Autopilot application 330, an agent 310 interacts with an Agent Copilot application 335, a supervisor 315 interacts with a Supervisor Copilot application 340, and a business analyst 320 interacts with an Enlighten Actions application 345. The LLM interface applications 325 communicate with LLM integration services 350, including interaction transcripts 352, interaction insights 354, integrations 356, a conversational application program interface (API) for free text reasoning 358, a conversation history service 360, and conversation history data 362. The LLM integration services 350 communicate with the LLM 365, to perform functions 367 such as analyzing and generating conversational text, create SQL queries, summarize, etc.

The LLM integration services 350 also communicate with a customer knowledge base 370, and with a federated data layer 375 (to, for example, execute the SQL scripts) in communication with a data lake 380 and Enlighten models 385, which communicate with customer experience optimization (XO) models 390, which communicate with a smart assistant application 395, which can communicate back to the LLM interface applications 325.

The improved SQL generation system may for example be embedded inside of the "Conversational API" box 358. The "Conversational API" may for example be in charge of transforming free text into SQL and calling the "Federated Data Layer" microservice to run the query against the data lake 380 (which may for example be implemented on top of Snowflake). The logic of calling a vector DB, as well as feeding it with values, could be built there. The feature that enables 'free text query' may for example be embedded in Enlighten Actions 345, or could be integrated into the co-pilot applications 330, 335, and/or 340.

Inputs to the conversational API 358 may include user questions in a string format, such as "give me top 10 Skills with the highest service level". The output of the conversational API may then include Json script language describing the returned schema, the results set and insight. For example:

```
"data": {
    "columnMetaData": [
        {
            "columnName": "SkillName",
            "columnType": "Varchar"
        },
```

-continued

```
    {
        "columnName": "ServiceLevel",
        "columnType": "Number"
    }
],
"resultList": [
    {
        "ServiceLevel": 1.0,
        "SkillName": "Analytics_Chat_Spanish_Skill"
    },
    {
        "ServiceLevel": 1.0,
        "SkillName": "OBPhoneSkillAutomation"
    },
    {
        "ServiceLevel": 0.431818,
        "SkillName": null
    },
    {
        "ServiceLevel": 0.333333,
        "SkillName": "Analytics_Call_en-EN_Skill"
    },
    {
        "ServiceLevel": 0.0,
        "SkillName": "IB Chat"
    },
    {
        "ServiceLevel": 0.0,
        "SkillName": "OBPhone"
    },
    {
        "ServiceLevel": 0.0,
        "SkillName": "OBPhone_CXA"
    },
    {
        "ServiceLevel": 0.0,
        "SkillName": "Outbound_phone_call"
    },
    {
        "ServiceLevel": 0.0,
        "SkillName": "Inbound Phone Skill"
    },
    {
        "ServiceLevel": 0.0,
        "SkillName": "chat_skill"
    }
]
}
```

Figure 4:
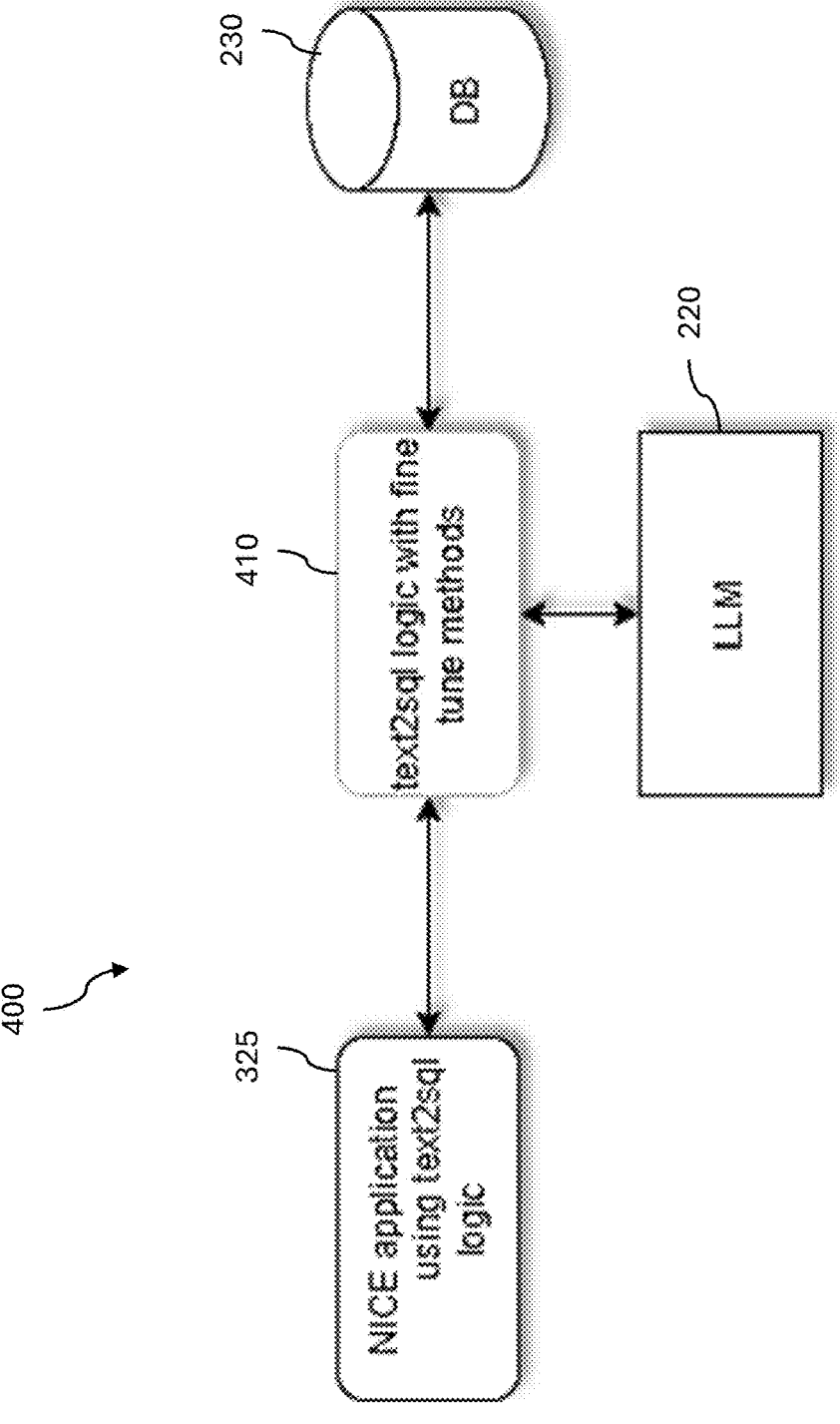
FIG. 4 is a schematic, diagrammatic representation of an architecture for incorporating an example improved SQL generation system into existing applications, in accordance with at least one embodiment of the present disclosure.

FIG. 4 is a schematic, diagrammatic representation of an architecture for incorporating an example improved SQL generation system 400 into existing applications 325, in accordance with at least one embodiment of the present disclosure. In an example, applications 325 that use existing text-to-SQL logic can call the new text-to-SQL logic 410 incorporating the fine-tuning methods of the present disclosure. The logic 410 communicates with the database 230 and the LLM 220.

Figure 5:
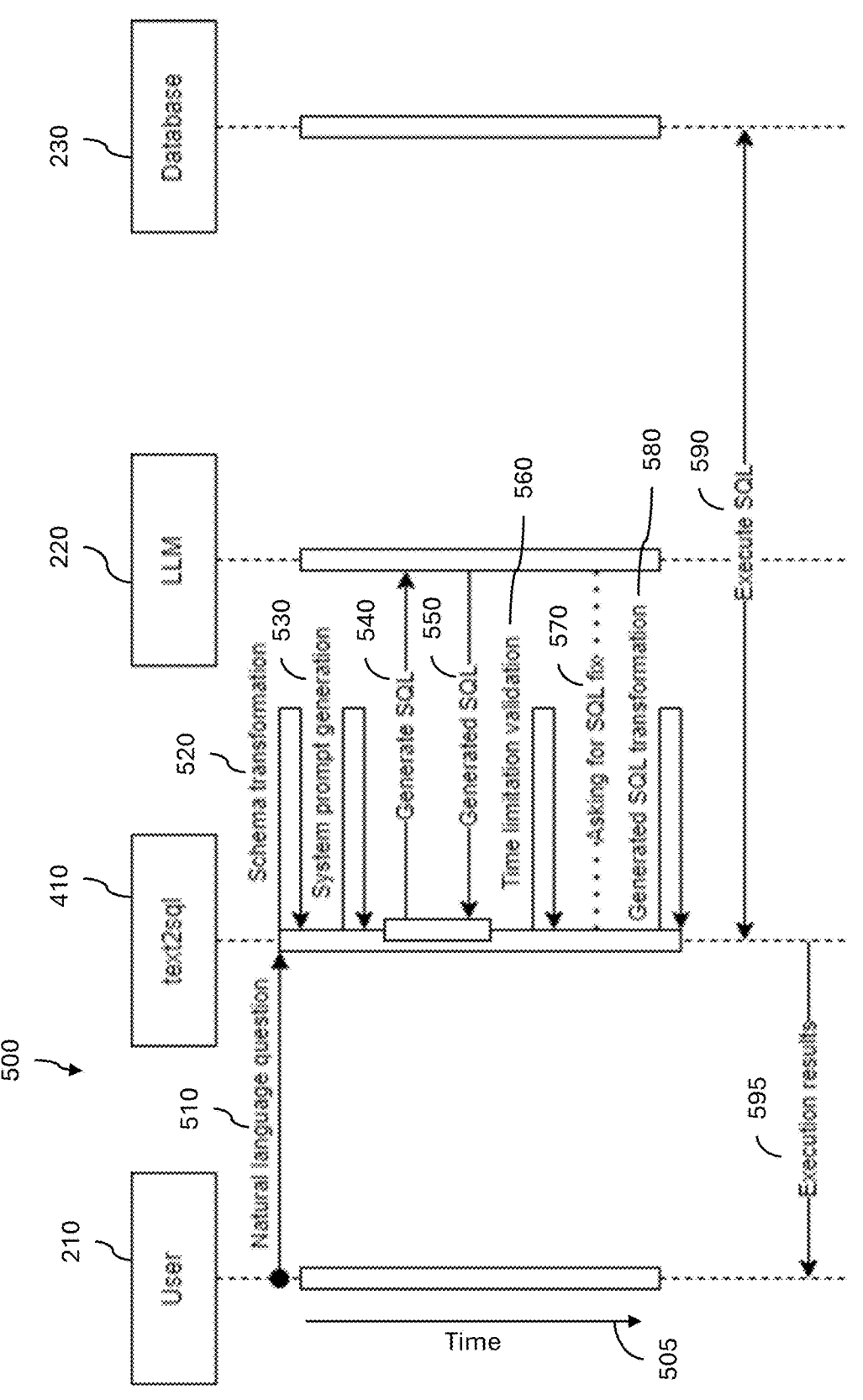
FIG. 5 is an operations diagram of an example improved SQL generation system, showing time on a vertical axis in accordance with at least one embodiment of the present disclosure.

FIG. 5 is an operations diagram of an example improved SQL generation system 500, showing time on a vertical axis 500 in accordance with at least one embodiment of the present disclosure. In the example shown in FIG. 5, a user 210 submits a natural language question 510 to a text-to-SQL generation module 410. The text-to-SQL generation module 410 performs schema transformation 520, system prompt generation 530, and then sends instructions 540 to the LLM 220 to generate SQL. The generated SQL 550 is passed from the LLM 220 back to the text-to-SQL module 410, which performs time limitation validation 560 and, if necessary, in a repair step 570, asks the LLM 220 to fix the SQL query. In a transformation step 580, the generated SQL query is then transformed back into the database schema. In an execution step 590, the text-to-SQL module 410 then executes the SQL query on the database 230 (e.g., using an SQL interpreter), and passes the execution results 595 back to the user 210.

The natural language to SQL service 410 is a service that improves SQL query generation accuracy from natural language input by implementing three main processing methods: name translation, time constraint validation, and dynamic value templating. The natural language to SQL service 410 processes natural language queries through sequential enhancement steps to produce accurate, compliant SQL queries.

Assumptions behind the natural language to SQL service 410 include:

Having access to the database schema that needs to be exposed to end users

Ability to identify timestamp columns in the schema by their data type/format

System has the default values for time and row limits

System maintains control over the LLM prompt engineering process

Figure 6:
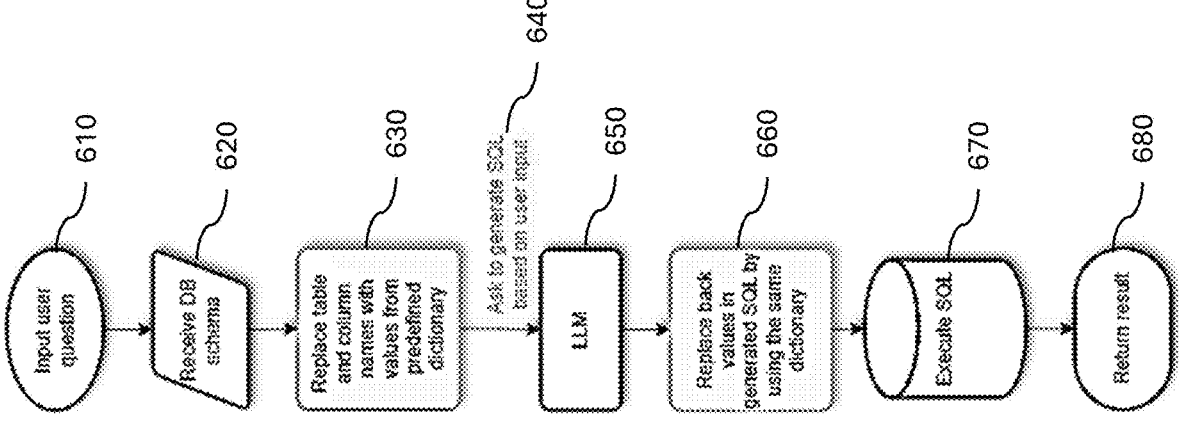
FIG. 6 is a schematic, diagrammatic representation, in flow diagram form, of an example schema translation method, in accordance with at least one embodiment of the present disclosure.
Figure 6:

FIG. 6 is a schematic, diagrammatic representation, in flow diagram form, of an example schema translation method 600, in accordance with at least one embodiment of the present disclosure. It is understood that the steps of method 600 may be performed in a different order than shown in FIG. 6, additional steps can be provided before, during, and after the steps, and/or some of the steps described can be replaced or eliminated in other embodiments. One or more of steps of the method 600 can be carried by one or more devices and/or systems described herein, such as components of the system 100, system 200, system 300, system 400, system 500, and/or processor circuit 1150.

The method 600 is a preprocessing and postprocessing component that handles database schema name transformations. It maintains dictionary mappings between internal and descriptive names, transforms schema names before LLM processing, and converts generated SQL back to internal names.

Examples of implementation include:

1. Example JSON Mapping Configuration:

```
{
    "tables": {
        "cust_int": {
            "descriptive_name": "CustomerInteraction",
            "columns": {
                "cust_int_id": "CustomerInteractionIdentifier",
                "int_timestamp": "InteractionTimestamp",
                "cust_fname": "CustomerFirstName"
            }
        },
        "emp_info": {
            "descriptive_name": "EmployeeInformation",
            "columns": {
                "emp_id": "EmployeeIdentifier",
                "emp_fname": "EmployeeFirstName"
            }
        }
    }
}
```

2. Dictionary Mapping Example:

```
name_mappings = {
    # Table mappings
    "cust_int": "CustomerInteraction",
    "emp_info": "EmployeeInformation",
```

-continued

```
# Column mappings
"cust_int_id": "CustomerInteractionIdentifier",
"int_timestamp": "InteractionTimestamp",
"cust_fname": "CustomerFirstName",
"emp_id": "EmployeeIdentifier",
"emp_fname": "EmployeeFirstName"
}
```

3. Pre-Processing Example:

```
Original Schema:
CREATE TABLE cust_int (
    cust_int_id INT PRIMARY KEY,
    cust_fname VARCHAR(50),
    cust_lname VARCHAR(50),
    int_timestamp DATETIME,
    int_type VARCHAR(20),
    emp_id INT
);
```

Transformed Schema:

```
CREATE TABLE CustomerInteraction (
    CustomerInteractionIdentifier INT PRIMARY KEY,
    CustomerFirstName VARCHAR(50),
    CustomerLastName VARCHAR(50),
    InteractionTimestamp DATETIME,
    InteractionType VARCHAR(20),
    EmployeeIdentifier INT
);
```

4. Query Translation Flow Example:
User Input:
"Show me all customer interactions with their first names from last week"
LLM Generated SQL (with Descriptive Names):

```
SELECT CustomerInteractionIdentifier,
    CustomerFirstName,
    InteractionTimestamp,
    InteractionType
FROM CustomerInteraction
WHERE Interaction Timestamp >=
DATEADD(DAY, -7, CURRENT_DATE( ))
```

Final Translated SQL for Execution (with Internal Names):

```
SELECT cust_int_id,
    cust_fname,
    int_timestamp,
    int_type
FROM cust int
WHERE int_timestamp >= DATEADD
(DAY, -7, CURRENT_DATE( ))
```

The Name Translation Dictionary operates in two phases. A pre-processing phase loads the dictionary of mappings between internal names and their descriptive equivalents, transforms the database schema by replacing all internal names with their descriptive counterparts, and maintains relationships between original and transformed names for reverse mapping. A post-processing phase takes the LLM-generated SQL query with descriptive names, performs reverse mapping to convert back to internal database names, and validates that all names have valid mappings before query execution.

In step 610, the method 600 includes receiving the input user question. Execution then proceeds to step 620.

In step 620, the method 600 includes receiving the database schema. Execution then proceeds to step 630.

In step 630, the method 600 includes replacing table and column names with descriptive values from a predefined dictionary. Execution then proceeds to step 640.

In step 640, the method 600 includes asking the LLM to generate an SQL query based on the user input. Execution then proceeds to step 650.

In step 650, the method 600 includes the LLM generating the SQL query. Execution then proceeds to step 660.

In step 660, the method 600 includes replacing the original column and table names into the SQL query using the same dictionary as for step 630. Execution then proceeds to step 670.

In step 670, the method 600 includes executing the SQL query. Execution then proceeds to step 680.

In step 680, the method 600 includes returning the SQL query result to the user. The method 600 is now complete.

Flow diagrams are provided herein for exemplary purposes; a person of ordinary skill in the art will recognize myriad variations that nonetheless fall within the scope of the present disclosure. For example, any of the steps described herein may optionally include an output to a user of information relevant to the step, and may thus represent an improvement in the user interface over existing art by providing information (whether static or dynamically updated) that is not otherwise available.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein.

Figure 7:
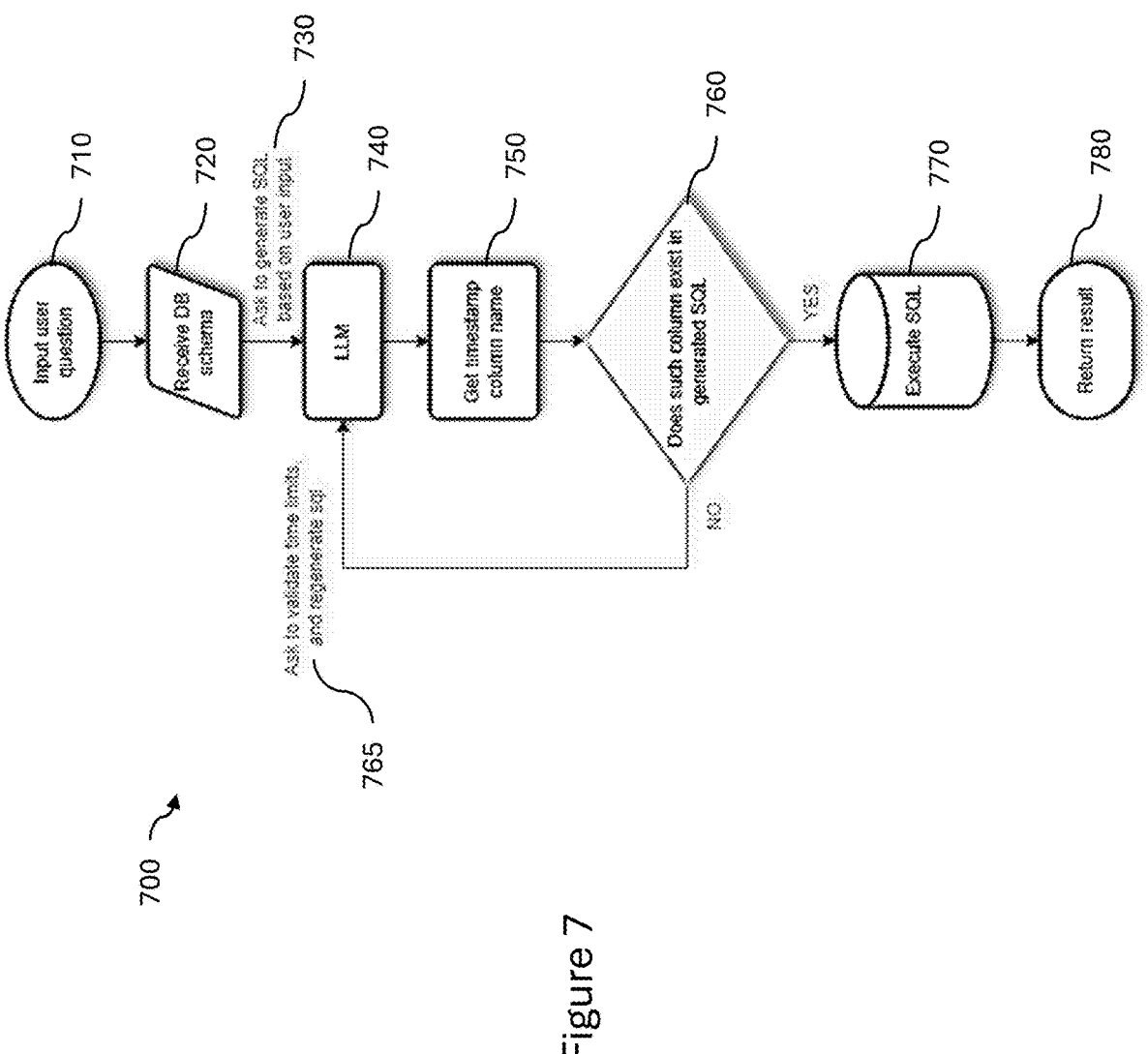
FIG. 7 is a schematic, diagrammatic representation, in flow diagram form, of an example time constraint validation method, in accordance with at least one embodiment of the present disclosure.

FIG. 7 is a schematic, diagrammatic representation, in flow diagram form, of an example time constraint validation method 700, in accordance with at least one embodiment of the present disclosure. The method 700 may for example be a validation component ensuring proper time constraints in generated queries. It identifies timestamp columns in database schemas, validates the presence of time constraints, adds missing time constraints using configured defaults, and (if needed) prompts the LLM to recheck and include the necessary time limitation.

Example
    User query: "Show me customer interactions"
    Generated SQL without validation: "SELECT*FROM customer_interactions"
    Validation Check: No time constraint found
    Additional question: "Please add time limitation with {DEFAULT_TIME_LIMIT} days"
    Fixed SQL by LLM: "SELECT*FROM customer_interactions WHERE interaction_timestamp>=DATEADD(DAY, -{DEFAULT_TIME_LIMIT}, CURRENT_DATE( ))"

The components executing the method may for example include a schema analyzer, which identifies timestamp columns in the schema, maintains mapping of tables and their associated timestamp columns, and runs during system initialization and schema updates. The components may also include a query validator, which parses generated SQL queries, checks for the presence of time constraints on relevant timestamp columns, and identifies missing or incorrect time constraints. The components may also include a constraint enforcer, which adds or modifies time constraints when missing or incorrect by specifying the issue to the LLM, and ensures consistent time range format across queries.

In step 710, the method 700 includes receiving an input user question. Execution then proceeds to step 720.

In step 720, the method 700 includes receiving the database schema. Execution then proceeds to step 730.

In step 730, the method 700 includes asking the LLM to generate an SQL query based on the user input. Execution then proceeds to step 740.

In step 740, the method 700 includes, with the LLM, generating the SQL query. Execution then proceeds to step 750.

In step 750, the method 700 includes getting the column name of the column that contains the timestamp. Execution then proceeds to step 760.

In step 760, the method 700 includes determining whether the timestamp column exists in the generated SQL query. If yes, execution then proceeds to step 770. If no, execution proceeds to step 765.

In step 765, the method 700 includes asking the LLM to validate the time limits and regenerate the SQL query. Execution then proceeds to step 740.

In step 770, the method 700 includes executing the SQL query generated by the LLM. Execution then proceeds to 780.

In step 780, the method 700 includes returning the result of the SQL query. The method 700 is now complete.

Figure 8:
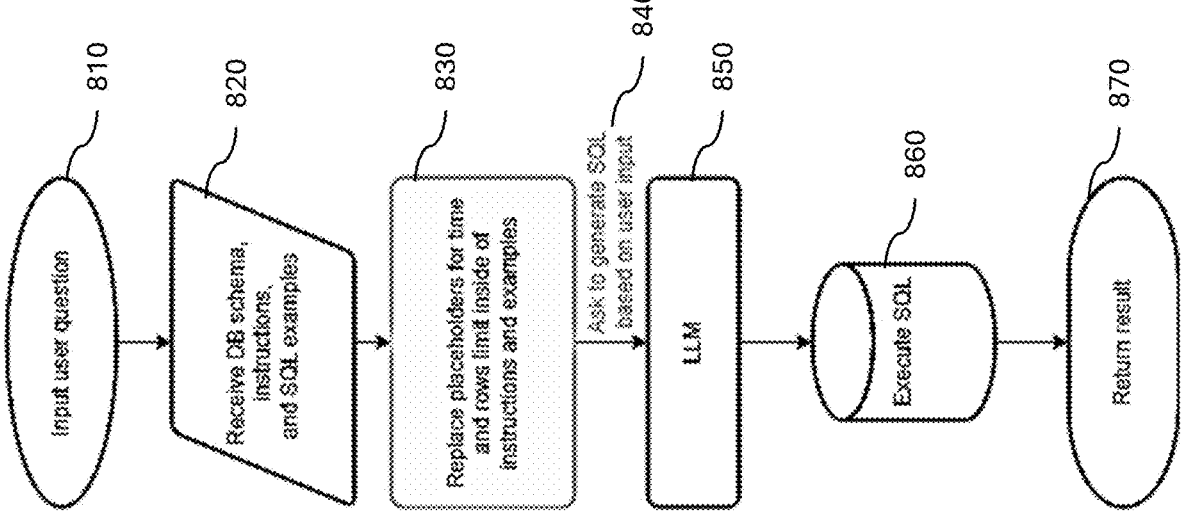
FIG. 8 is a schematic, diagrammatic representation, in flow diagram form, of an example time dynamic value templating method, in accordance with at least one embodiment of the present disclosure.
Figure 8:

FIG. 8 is a schematic, diagrammatic representation, in flow diagram form, of an example time dynamic value templating method 800, in accordance with at least one embodiment of the present disclosure. The method 800 may for example be a template management component that reinforces consistent application of default limits through both instruction templates and example queries provided to the LLM. In an example, the method 800 maintains instruction templates with placeholders for default values, provides example queries showing proper placeholder usage, and eEnsures consistent understanding of default limits application through repetitive demonstration.

Example part of the prompt template:

. . .

Instruction Template:
"Generate SQL query following these rules:
Limit results to {DEFAULT_ROWS_LIMIT} rows if not specified
Include time constraint not older than {DEFAULT_TIME_LIMIT} days if not specified"
Example query in the prompt:
User question:
"Show best performing agents"
SQL example:
SELECT agent_name, success_rate
FROM agent_performance
WHERE performance_date>=DATEADD (DAY, −{DEFAULT_TIME_LIMIT}, CURRENT_DATE( ))
ORDER BY success_rate DESC
LIMIT {DEFAULT_ROWS_LIMIT}

The method 800 may for example be executed by a template manager which maintains SQL query templates with placeholders, and manages example queries showing proper limit usage.

In step 810, the method 800 includes receiving the input user question. Execution then proceeds to step 820.

In step 820, the method 800 includes receiving the database schema, instructions, and SQL examples. Execution then proceeds to step 830.

In step 830, the method 800 includes replacing the placeholders for time and row limits inside of the instructions and examples. Execution then proceeds to step 840.

In step 840, the method 800 includes asking the LLM to generate an SQL query based on the user input. Execution then proceeds to step 850.

In step 850, the method 800 includes, with the LLM, generating the SQL query. Execution then proceeds to step 860.

In step 860, the method 800 includes executing the SQL query. Execution then proceeds to step 870.

In step 870, the method 800 includes returning the result of the SQL query. The method 800 is now complete.

Figure 9:
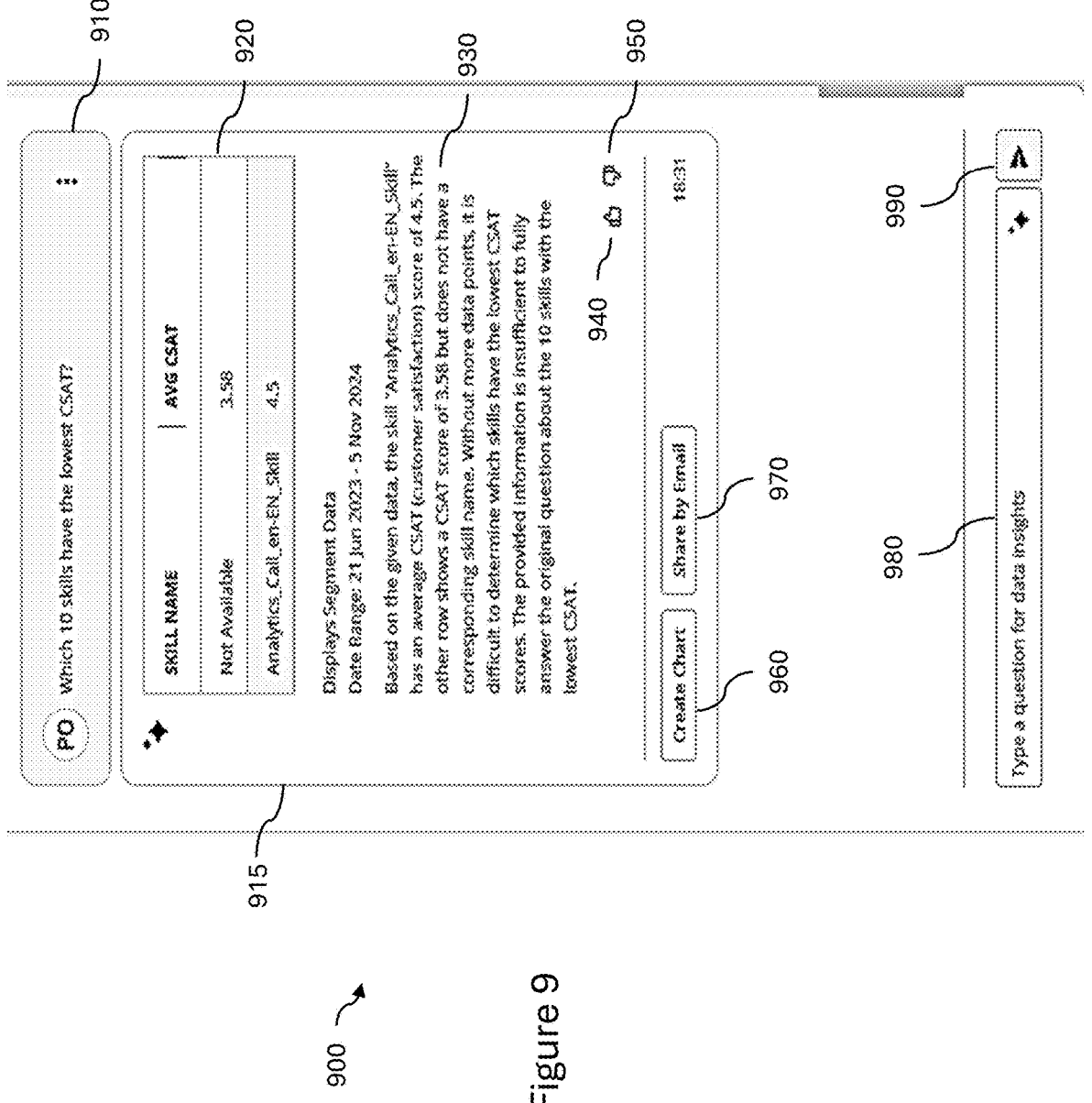
FIG. 9 is a screen display for an example improved SQL generation system, in accordance with at least one embodiment of the present disclosure.

FIG. 9 is a screen display 900 for an example improved SQL generation system, in accordance with at least one embodiment of the present disclosure. The screen display 900 includes a text window 910 containing the most recently asked user question, a results window 915, and a text input box 980 with submit button 990, for asking additional questions. The results window 915 includes a tabular result 920, a text summary 930, a like button 940, a dislike button 950, a create chart button 960, and a share by email button 970. In an example, the question shown in text box 910 has been converted to an SQL query, which is used to query a database and generate a query result, which is then fed back to the LLM to generate the tabular result 920 and text summary 930. The like button 940 and dislike button 950 can then be used to notify the LLM and/or the improved SQL generation system whether the result is useful or not.

Figure 10:
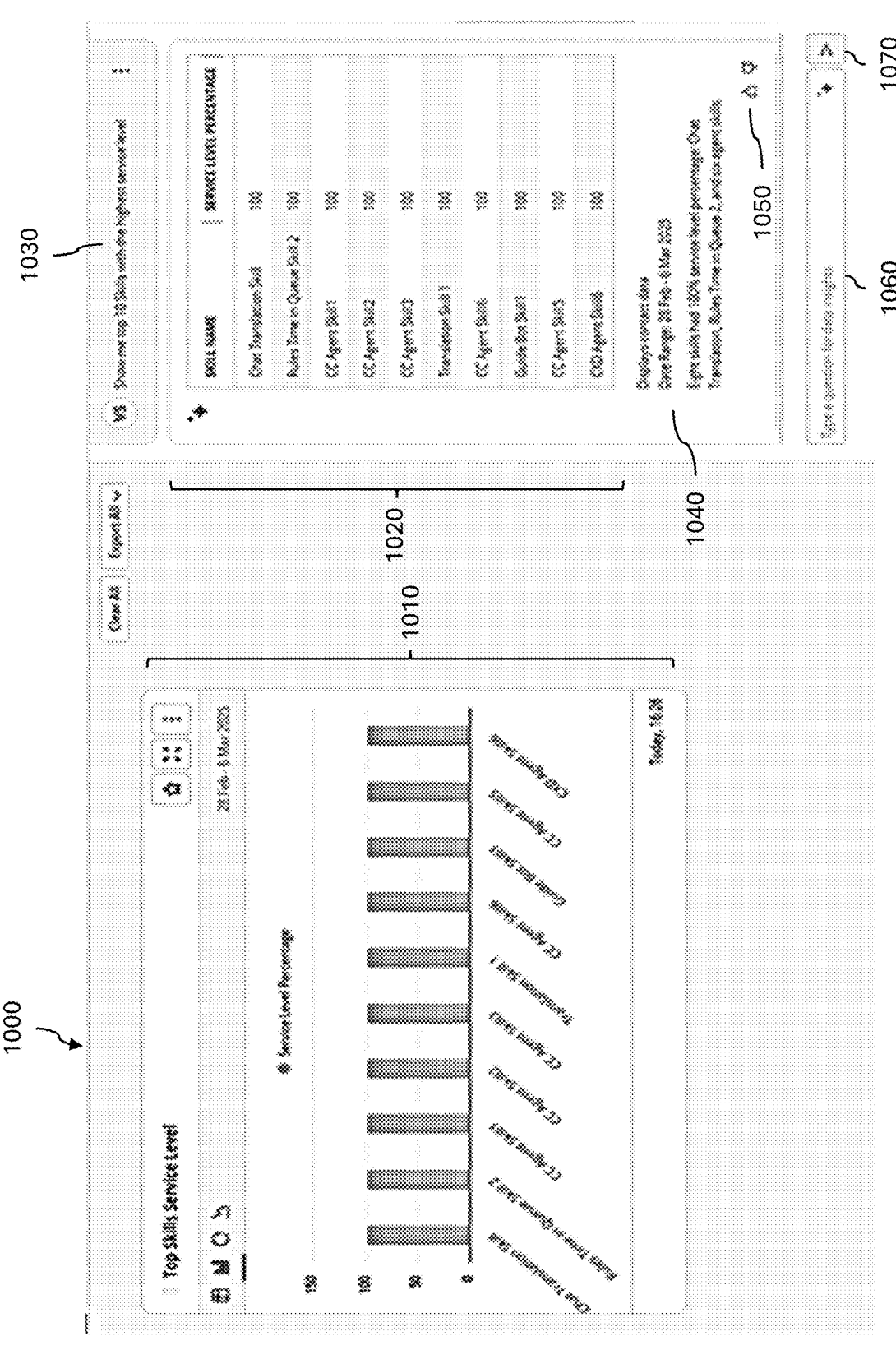
FIG. 10 is a screen display for an example improved SQL generation system, in accordance with at least one embodiment of the present disclosure.

FIG. 10 is a screen display 1000 for an example improved SQL generation system, in accordance with at least one embodiment of the present disclosure. In a text entry box 1060, the user types a query and presses the send button 1070. The question is then displayed in a text box 1030, and once results are returned, they are added to the right panel 1020. In the example shown in FIG. 10, the user asked about "top 10 Skills with the highest service level". As a result the right panel 1020 displays a table with two columns-Skill Name and Service Level Percentage. A text description 1040 under the table may for example be generated automatically by another request to the LLM. The screen display 1000 also includes like/dislike buttons 1050 that can be used to vote on the usefulness of the results, and a graphical representation 1010 of the tabular data in the right panel 1020.

Figure 11:
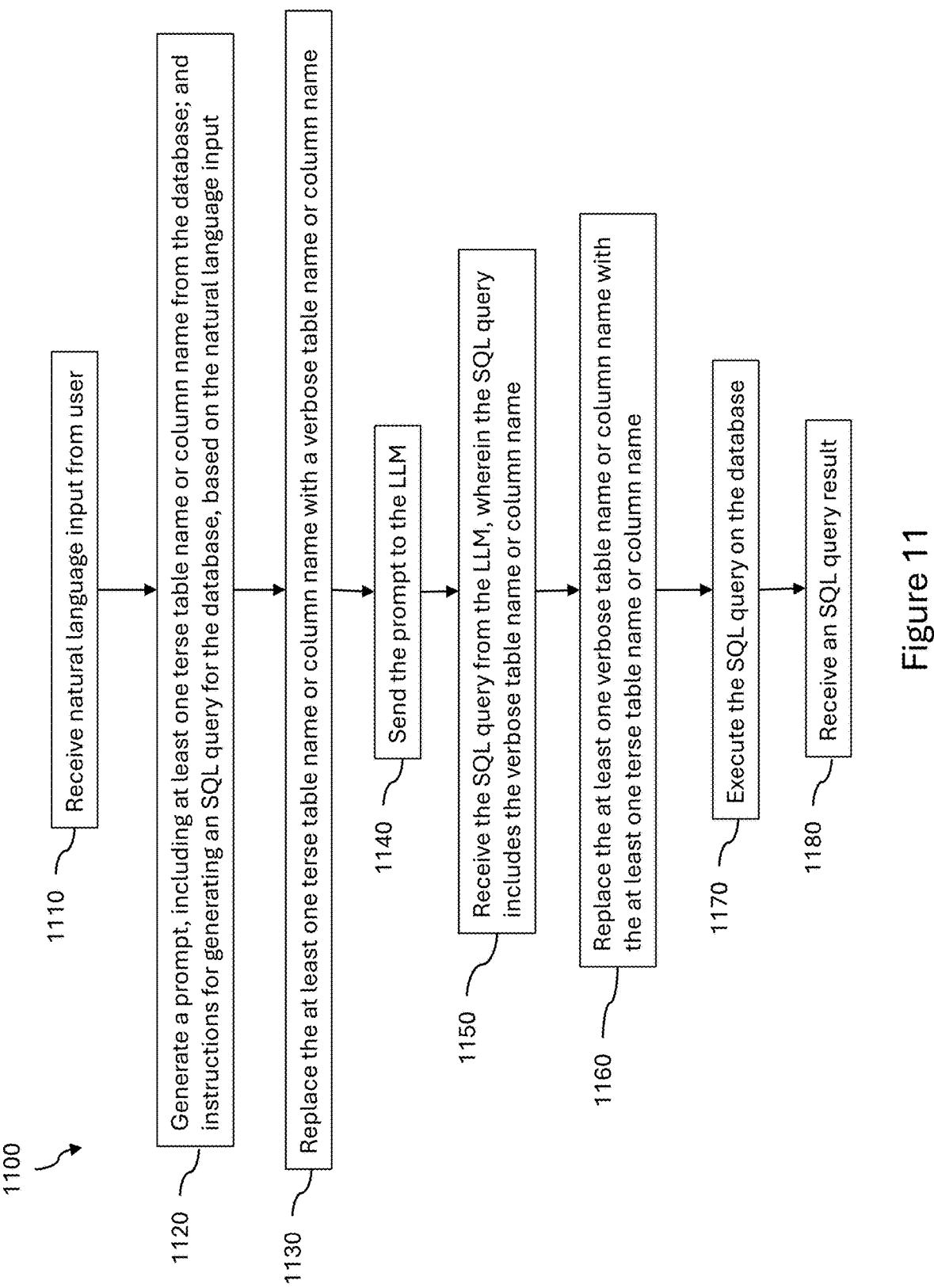
FIG. 11 is a schematic, diagrammatic representation, in flow diagram form, of an example improved SQL generation method, in accordance with at least one embodiment of the present disclosure.

FIG. 11 is a schematic, diagrammatic representation, in flow diagram form, of an example improved SQL generation method 1100, in accordance with at least one embodiment of the present disclosure.

In step 1110, the method 1100 includes receiving a natural language input from a user. Execution then proceeds to step 1120.

In step 1120, the method 1100 includes, based on the natural language input, generating an LLM prompt, which includes at least one terse table name or column name from a database (e.g., a table or column name that is not descriptive enough of the table or column content to be readily understood by the LLM). The LLM prompt also includes instructions for generating an SQL query for the database. Execution then proceeds to step 1130.

In step 1130, the method 1100 includes replacing the at least one terse table name or column name with at least one verbose table name or column name (e.g., a name that is descriptive enough of the table or column content to be readily understood by the LLM). Execution then proceeds to step 1140.

In step 1140, the method 1100 includes sending the resulting prompt to the LLM. Execution then proceeds to step 1150.

In step 1150, the method 1100 includes receiving an SQL query from the LLM as a response to the prompt, wherein the SQL query includes the at least one verbose table name or column name. Execution then proceeds to step 1160.

In step 1160, the method 1100 includes replacing the at least one verbose table name or column name with the at least one terse table name or column name. Execution then proceeds to step 1170.

In step 1170, the method 1100 includes executing the SQL query on the database. This may for example involve the use of an SQL interpreter. Execution then proceeds to step 1180.

In step 1180, the method 1100 includes receiving a result for the SQL query. The method 1100 is now complete.

Figure 12:
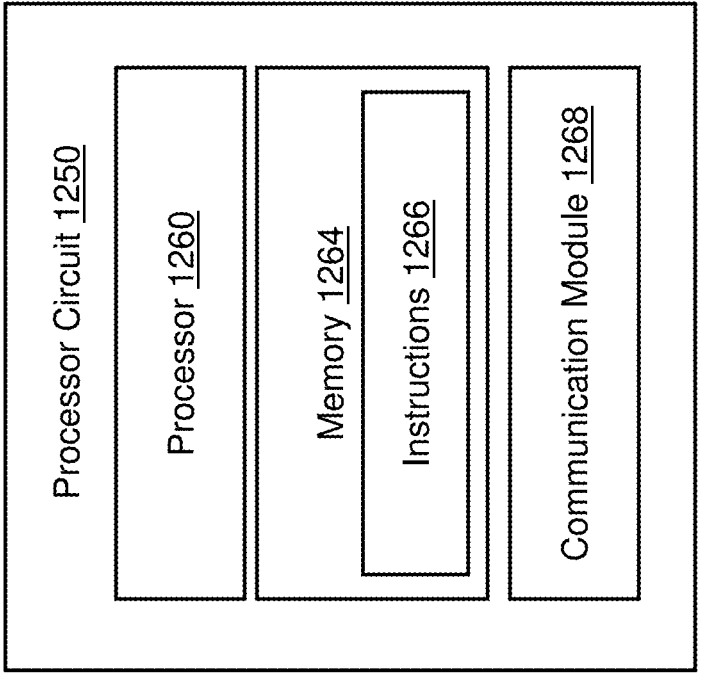
FIG. 12 is a schematic diagram of a processor circuit, in accordance with at least one embodiment of the present disclosure.

FIG. 12 is a schematic diagram of a processor circuit 1250, in accordance with at least one embodiment of the present disclosure. The processor circuit 1250 may be implemented in the system 100, or other devices or workstations, or on a cloud processor or other remote processing unit, as necessary to implement the method. As shown, the processor circuit 1250 may include a processor 1260, a memory 1264, and a communication module 1268. These elements may be in direct or indirect communication with each other, for example via one or more buses.

The processor 1260 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1260 may also comprise another hardware device, a firmware device, or any combination thereof configured to perform the operations described herein. The processor 1260 may also be implemented as a combination of computing devices, e.g., a combination of a DSP and a microprocessor, a plurality of microprocessors, one or more microprocessors in conjunction with a DSP core, or any other such configuration.

The memory 1264 may include a cache memory (e.g., a cache memory of the processor 1260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1264 includes a non-transitory computer-readable medium. The memory 1264 may store instructions 1266. The instructions 1266 may include instructions that, when executed by the processor 1260, cause the processor 1260 to perform the operations described herein. Instructions 1266 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1268 can include any electronic circuitry and/or logic circuitry to facilitate direct or indirect communication of data between the processor circuit 1250, and other processors or devices. In that regard, the communication module 1268 can be an input/output (I/O) device. In some instances, the communication module 1268 facilitates direct or indirect communication between various elements of the processor circuit 1250 and/or the system 100. The communication module 1268 may communicate within the processor circuit 1250 through numerous methods or protocols. Serial communication protocols may include but are not limited to United States Serial Protocol Interface (US SPI), Inter-Integrated Circuit (I2C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, etc.) may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the improved SQL generation system advantageously improves the ability of the LLM to generate well-formed, efficient SQL queries based on natural language inputs from the user. A number of variations are possible on the examples and embodiments described above. For example, other generative text systems may be used than LLMs, and other query languages may be used than SQL, without departing from the spirit of the present disclosure. The improved SQL generation system may be incorporated into user applications or systems, or may be incorporated into the LLM itself. The technology described herein may be applied to diverse industries, including fraud detection, contact center management, or any other environment where SQL is used to query databases, and where users may not be familiar with SQL syntax, but are capable of forming descriptive natural language inputs that can be translated into SQL.

The logical operations making up the embodiments of the technology described herein are referred to variously as operations, steps, blocks, objects, elements, components, or modules. Furthermore, it should be understood that these may occur, or be performed or arranged, in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, upstream, downstream, proximal, and distal are only used for identification purposes to aid the reader's understanding of the claimed subject matter, and do not create limitations, particularly as to the position, orientation, or use of the improved SQL generation system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the improved SQL generation system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A real-time system for generating Structured Query Language (SQL) queries from natural language input, the system comprising:
a language server having at least one processor and a non-transitory computer readable medium operably coupled thereto, the server being in electronic communication with a large language model (LLM), the server being configured to receive a natural language input from a user, send a prompt to the LLM, and receive an SQL query from the LLM, the processor comprising a graphical user interface (GUI), an SQL interpreter, a prompt generation service, and a prompt refinement service, the server being in electronic communication with a database, the computer readable medium comprising a plurality of instructions stored in association therewith that are accessible to, and executable by, the processor, to perform operations which comprise:

with the GUI, receiving the natural language input from the user;
from the database, receiving a database schema comprising at least one terse table name or column name;
with the prompt refinement service, within the database schema, replacing the at least one terse table name or column name with at least one verbose table name or column name;
with the prompt generation service, the natural language input, and the database, generating a prompt, wherein the prompt comprises:
the at least one verbose table name or column name from the database schema; and
instructions for generating an SQL query for the database, based on the natural language input;
sending the prompt to the LLM;
receiving the SQL query from the LLM, wherein the SQL query includes the at least one verbose table name or column name;
within the SQL query, replacing the at least one verbose table name or column name with the at least one terse table name or column name;
with the SQL interpreter, executing the SQL query on the database; and
from the SQL interpreter, receiving an SQL query result.

2. The system of claim 1, wherein the operations further comprise:
adding, to the prompt, an instruction or SQL example comprising a time limit placeholder or row limit placeholder; and
replacing the time limit placeholder with a time limit or the row limit placeholder with a row limit.

3. The system of claim 1, wherein the operations further comprise:
determining whether the SQL query includes a condition on a timestamp column; and
if the SQL query does not include the condition on the timestamp column:
revising the prompt to instruct the LLM to include the condition on the timestamp column; and
sending the revised prompt to the LLM.

4. The system of claim 1, wherein the operations further comprise:
if the SQL query result includes an exception or error message:
revising the prompt to include the exception or error message;
sending the revised prompt to the LLM;
receiving the revised SQL query from the LLM;
with the SQL interpreter, executing the revised SQL query on the database; and
from the SQL interpreter, receiving a revised SQL query result.

5. The system of claim 1, wherein the operations further comprise:
based on the SQL query result, generating a graph or table; and
with the GUI, displaying the graph or table to the user.

6. The system of claim 1, wherein the operations further comprise:
based on the SQL query result, generating a second prompt instructing the LLM to explain the SQL query result;
sending the second prompt to the LLM;
receiving an LLM response; and
with the GUI, displaying the LLM response.

7. The system of claim 1, wherein the at least one terse table name or column name from the database is identified via a schema of the database, and wherein the schema of the database is included in the prompt.

8. The system of claim 1, wherein replacing the at least one terse table name or column name with the at least one verbose table name or column name results in higher accuracy for the LLM in generating an SQL query with valid syntax.

9. The system of claim 1, wherein replacing the at least one terse table name or column name with the at least one verbose table name or column name results in faster execution time for the SQL query.

10. The system of claim 1, wherein replacing the at least one terse table name or column name with the at least one verbose table name or column name results in an improvement, within the SQL query generated by the LLM, in the relevance of selected table and column names.

11. A computer-implemented method for generating Structured Query Language (SQL) queries from natural language input, which method comprises:

with a language server having at least one processor and a non-transitory computer readable medium operably coupled thereto, the server being in electronic communication with a large language model (LLM), the server being configured to receive a natural language input from a user, send a prompt to the LLM, and receive an SQL query from the LLM, the processor comprising a graphical user interface (GUI), an SQL interpreter, a prompt generation service, and a prompt refinement service, the server being in electronic communication with a database, performing operations which comprise:

with the GUI, receiving the natural language input from the user;

from the database, receiving a database schema comprising at least one terse table name or column name;

with the prompt refinement service, within the database schema, replacing the at least one terse table name or column name with at least one verbose table name or column name;

with the prompt generation service, the natural language input, and the database, generating a prompt, wherein the prompt comprises:

the at least one verbose table name or column name from the database schema; and instructions for generating an SQL query for the database, based on the natural language input;

sending the prompt to the LLM;

receiving the SQL query from the LLM, wherein the SQL query includes the at least one verbose table name or column name;

within the SQL query, replacing the at least one verbose table name or column name with the at least one terse table name or column name;

with the SQL interpreter, executing the SQL query on the database; and from the SQL interpreter, receiving an SQL query result.

12. The method of claim 11, wherein the operations further comprise:

adding, to the prompt, an instruction or SQL example comprising a time limit placeholder or row limit placeholder; and replacing the time limit placeholder with a time limit or the row limit placeholder with a row limit.

13. The method of claim 11, wherein the operations further comprise:

determining whether the SQL query includes a condition on a timestamp column; and if the SQL query does not include the condition on the timestamp column:

revising the prompt to instruct the LLM to include the condition on the timestamp column; and sending the revised prompt to the LLM.

14. The method of claim 11, wherein the operations further comprise:

if the SQL query result includes an exception or error message:

revising the prompt to include the exception or error message;

sending the revised prompt to the LLM;

receiving the revised SQL query from the LLM;

with the SQL interpreter, executing the revised SQL query on the database; and from the SQL interpreter, receiving a revised SQL query result.

15. The method of claim 11, wherein the operations further comprise:

based on the SQL query result, generating a graph or table; and with the GUI, displaying the graph or table to the user.

16. The method of claim 11, wherein the operations further comprise:

based on the SQL query result, generating a second prompt instructing the LLM to explain the SQL query result;

sending the second prompt to the LLM;

receiving an LLM response; and with the GUI, displaying the LLM response.

17. The method of claim 11, wherein the at least one terse table name or column name from the database is identified via a schema of the database, and wherein the schema of the database is included in the prompt.

18. The method of claim 11, wherein replacing the at least one terse table name or column name with the at least one verbose table name or column name results in higher accuracy for the LLM in generating an SQL query with valid syntax.

19. The method of claim 11, wherein replacing the at least one terse table name or column name with the at least one verbose table name or column name results in faster execution time for the SQL query.

20. The method of claim 11, wherein replacing the at least one terse table name or column name with the at least one verbose table name or column name results in an improvement, within the SQL query generated by the LLM, in the relevance of selected table and column names.

\* \* \* \* \*